US011254325B2

(12) United States Patent
Milton

(10) Patent No.: US 11,254,325 B2
(45) Date of Patent: Feb. 22, 2022

(54) VEHICLE-DATA ANALYTICS

(71) Applicant: Stephen Milton, Lyons, CO (US)

(72) Inventor: Stephen Milton, Lyons, CO (US)

(73) Assignee: MOOVE.AI, Lyons, CO (US)

( * ) Notice: Subject to any disclaimer, the term of this patent is extended or adjusted under 35 U.S.C. 154(b) by 239 days.

(21) Appl. No.: 16/510,942

(22) Filed: Jul. 14, 2019

(65) Prior Publication Data

US 2020/0017117 A1 Jan. 16, 2020

Related U.S. Application Data

(60) Provisional application No. 62/698,042, filed on Jul. 14, 2018.

(51) Int. Cl.
| | |
|---|---|
| *B60W 50/04* | (2006.01) |
| *G06N 3/08* | (2006.01) |
| *H04W 4/44* | (2018.01) |
| *H04W 4/021* | (2018.01) |
| *G07C 5/00* | (2006.01) |
| *B60W 50/02* | (2012.01) |
| *B60W 50/00* | (2006.01) |

(52) U.S. Cl.
CPC .......... *B60W 50/045* (2013.01); *B60W 50/02* (2013.01); *G06N 3/08* (2013.01); *G07C 5/008* (2013.01); *H04W 4/021* (2013.01); *H04W 4/44* (2018.02); *B60W 2050/0075* (2013.01); *B60W 2050/0215* (2013.01); *B60W 2540/106* (2013.01); *B60W 2556/10* (2020.02); *B60W 2556/45* (2020.02)

(58) Field of Classification Search
CPC combination set(s) only.
See application file for complete search history.

(56) References Cited

U.S. PATENT DOCUMENTS

| | | | |
|---|---|---|---|
| 7,791,503 | B2 | 9/2010 | Breed et al. |
| 9,286,524 | B1 | 3/2016 | Mei et al. |
| 9,761,131 | B2 * | 9/2017 | Robinson ........... G06K 9/00785 |
| 9,843,901 | B2 | 12/2017 | Mihaly et al. |
| 9,940,834 | B1 * | 4/2018 | Konrardy ............... G08G 1/161 |
| 10,460,183 | B2 * | 10/2019 | Welland ............... G06K 9/6256 |
| 2010/0023265 | A1 | 1/2010 | Huang et al. |
| 2014/0142799 | A1 | 5/2014 | Ferguson et al. |
| 2015/0199617 | A1 * | 7/2015 | Kuwajima ............. G06N 20/00 706/20 |
| 2016/0214535 | A1 | 7/2016 | Penilla et al. |

(Continued)

FOREIGN PATENT DOCUMENTS

| | | |
|---|---|---|
| EP | 3099552 B1 | 9/2018 |
| KR | 10-2015-0007536 A | 1/2015 |

OTHER PUBLICATIONS

International Preliminary Report on Patentability in International Application PCT/US2019/041746 dated Jan. 28, 2021 (7 pages).

(Continued)

*Primary Examiner* — Aniss Chad
*Assistant Examiner* — Christopher George Fees
(74) *Attorney, Agent, or Firm* — Pillsbury Winthrop Shaw Pittman LLP

(57) ABSTRACT

Provided is a system configured to determine and push adjustments to vehicle operations using machine-learning systems across multiple computing layers.

20 Claims, 4 Drawing Sheets

(56) References Cited

U.S. PATENT DOCUMENTS

| | | |
|---|---|---|
| 2016/0334230 A1 | 11/2016 | Ross et al. |
| 2016/0378112 A1 | 12/2016 | Ljubuncic et al. |
| 2017/0060574 A1 | 3/2017 | Malladi et al. |
| 2017/0352262 A1 | 12/2017 | Xu et al. |
| 2017/0369016 A1 | 12/2017 | Gurghian et al. |
| 2018/0074493 A1 | 3/2018 | Prokhorov et al. |
| 2018/0127000 A1* | 5/2018 | Jiang .................. G06F 16/2358 |
| 2018/0190047 A1* | 7/2018 | Maria .................... H04L 67/18 |
| 2020/0017117 A1 | 1/2020 | Milton |
| 2020/0033868 A1 | 1/2020 | Palanisamy et al. |
| 2020/0070844 A1 | 3/2020 | Goto |

OTHER PUBLICATIONS

Maloney, Conor, "Volkswagen Seeks Patent for Inter-Vehicular Blockchain Communications," https://www.ccn.com/volkswagen-seeks-patent-for-inter-vehicular-blockchain-communications-system/, Jul. 5, 2018, pp. 1-4.

Interational Search Report and Written Opinion in related International application PCT/US2021/024990 dated Jul. 6, 2021.

* cited by examiner

VEHICLE-DATA ANALYTICS

CROSS-REFERENCE TO RELATED APPLICATIONS

This patent claims the benefit of U.S. Provisional Patent Application 62/698,042, filed 14 Jul. 2018, titled AUTOMOTIVE-DATA ANALYTICS. The entire content of each afore-listed earlier-filed application is hereby incorporated by reference for all purposes.

BACKGROUND

1. Field

The present disclosure relates generally to computing and, more specifically, to vehicle data analytics.

2. Description of the Related Art

Traditionally, those analyzing large quantities of data related to user geolocations have processed data from mobile devices, like intermittently reported geolocations. Systems suitable for these use cases are not expected to accommodate geolocation data and related data streams from automobiles or other vehicles. These vehicles may possess a variety of electronic devices such as geolocation devices, sensor suites, and transmitters can be positioned in a variety of vehicles. Such vehicles may include remotely-controlled vehicles, semi-autonomous vehicles, and fully autonomous vehicles. These vehicles are capable of providing relatively high-accuracy, high-dimensional, high-bandwidth data that challenge the limits of such traditional analysis. Examples of such data include geolocation with centimeter-level accuracy being provided every 1 to 500 milliseconds. This geolocation data can be paired with data feeds from high-dimensional data such as video feeds, light detection and ranging (LIDAR) feeds, ultrasonic depth sensors, and on-board vehicle diagnostic sensors.

The dimensionality and frequency of geolocation data and associated sensor data available from a vehicle provides an opportunity to extract insights and provide actionable data to various stakeholders in the transportation and infrastructure community. However, existing data infrastructures are not prepared to exploit or even ingest the high-dimensional, high-frequency data available from modern vehicles. This is due in part to the limitations of existing infrastructure to process the amount and variety of data from a single vehicle or multiple vehicles. However, merely adding more computing power to the mix is not expected to address the issue. The frequency, sparseness, and multi-dimensional nature of vehicle sensor data makes traditional analysis difficult to effectively perform at scale and reduces the confidence in any analysis results. This issue is exacerbated when a plurality of vehicles may report a different set of sensor measurements at different calibrations and standards.

SUMMARY

The following is a non-exhaustive listing of some aspects of the present techniques. These and other aspects are described in the following disclosure.

Some aspects include a process that includes processing and transferring sensor data from vehicles across different computing levels for machine-learning operations to compute adjustments for the vehicle control systems.

Some aspects include a process that includes obtaining a first set of geolocations, a first set of control-system data, and a first set of vehicle proximity data using a first set of sensors, wherein: the first set of sensors is attached to a first vehicle, the first vehicle includes one or more processors executing a first vehicle application operating as a part of a vehicle computing layer, wherein the vehicle computing layer comprises a set of vehicle applications operating on a first set of processors, wherein each of the first set of processors are attached to one or more vehicles, the first set of geolocations, the first set of control-system data, the a first set of vehicle proximity data are concurrently obtained, the first set of control-system data comprises data indicating a use of a control system of the first vehicle, and the first set of vehicle proximity data comprises data corresponding to a distance to an object from the first vehicle; inferring, using the one or more processors attached to the first vehicle, a first set of vehicle computing layer results based on the first set of control-system data and the first set of vehicle proximity data using a neural network executing on the vehicle computing layer; sending the first set of vehicle computing layer results and the first set of geolocations to a local application executing on a local computing layer, wherein the local application comprises a neural network executing on the local computing layer, and wherein the local application also is configured to receive a second set of vehicle computing layer results and second set of geolocations from a second vehicle; training the neural network executing on the local computing layer to determine a first set of local computing layer results based on the first set of control-system data, the first set of geolocations, and a second set of control-system data from a second vehicle, wherein: the first set of local computing layer results comprises a control-system adjustment value, wherein the control-system adjustment value is at least one of a parameter used by the control system to determine a vehicle response of the first vehicle to an operator-effected change on the control system or a change in the parameter, and sending the first set of local computing layer results to a top-view application executing on a top-view computing layer, wherein the top-view computing application comprises a neural network executing on the top-view computing layer, and wherein the top-view computing application also receives a second set of local computing layer results and third set of geolocations from a third vehicle; training a top-view computing neural network based on the first set of local computing layer results to determine a top-view control-system adjustment value based on a region containing the first set of geolocations, the second set of geolocations, and the third set of geolocations, wherein the top-view control-system adjustment value is different from the control-system adjustment value; updating the control-system adjustment value based on the top-view control-system adjustment value; transmitting the control-system adjustment value to the first vehicle; and adjusting a vehicle response to an operator-effected change in the first vehicle based on the control-system adjustment value.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
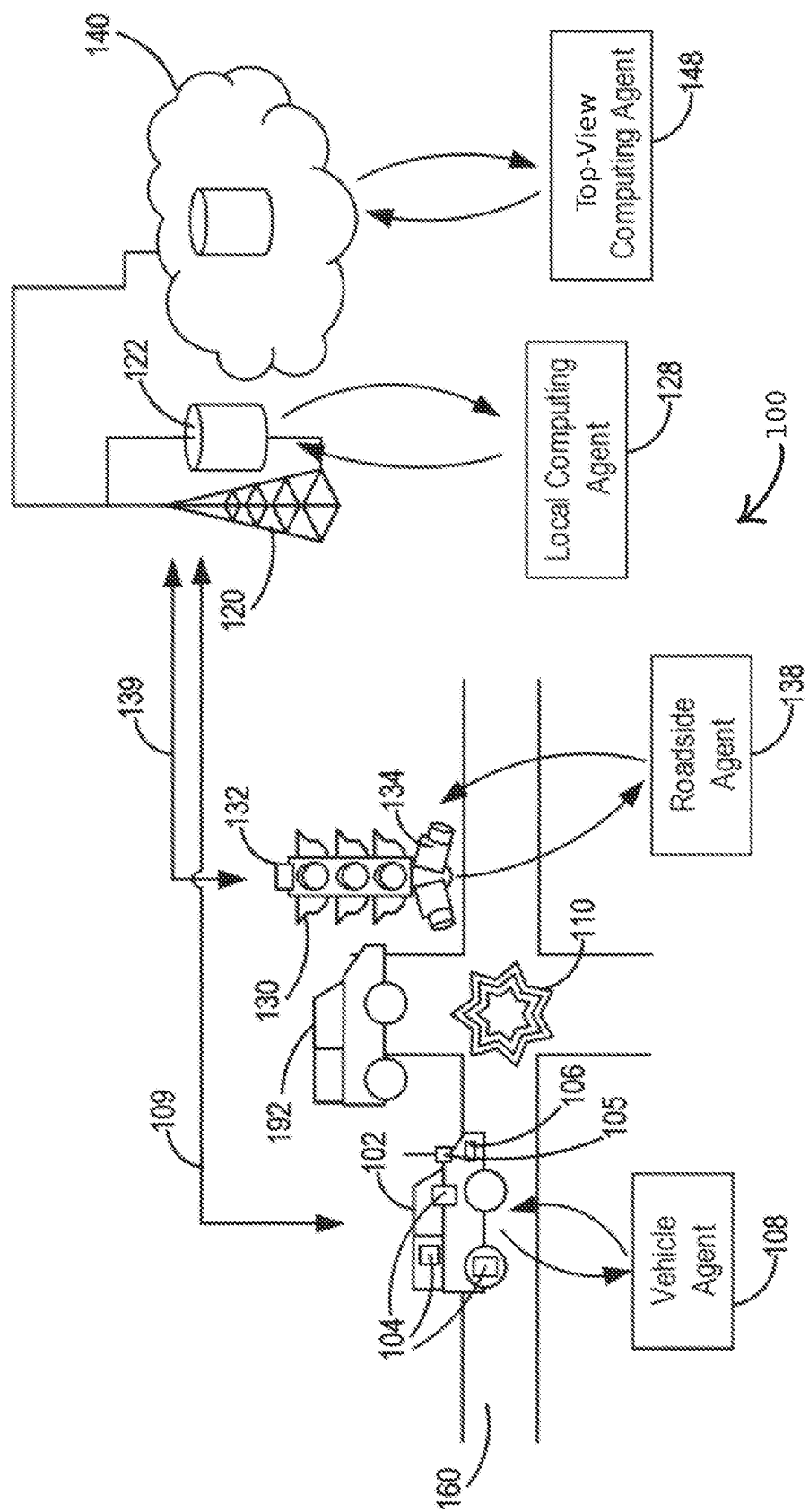
FIG. 1 is a schematic diagram of a first computing environment in which various machine-learning infrastructure may be implemented with the present techniques in accordance with some embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION

To mitigate the problems described herein, the inventors had to both invent solutions and, in some cases just as importantly, recognize problems overlooked (or not yet foreseen) by others in the field of data analytics. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Some embodiments may implement a federated machine-learning architecture that supports active learning to infer things about vehicles, drivers, and places based on relatively high-bandwidth on-board and road-side sensor feeds. Some embodiments may distribute computing resources hierarchically, e.g., at the vehicle (or sub-system, like braking system) level, at the neighborhood level, at the regional level, and at supra-regional levels, and lower-level computing resources may, in effect, apply a form of lossy-compression to data from lower-levels with machine-learning techniques before reporting results upward as inputs to high levels of the architecture. Examples of suitable machine-learning approaches include supervised machine-learning techniques, un-supervised machine-learning techniques, and reinforcement learning. Some embodiments may combine various models at various layers, in some cases optimizing model parameters according to an objective function solely within the context of one of the models, or in some cases, optimizing model parameters across models as well, e.g., with global optimization of some parameters.

The resulting suite of trained machine-learning models may be used to various ends. In some cases, vehicle manufacturers or fleet operators may configure various adjustable attributes of vehicles to make the vehicles more suitable for a given operator, place, time, or combination thereof. In some cases, governmental agencies may take responsive action to re-configure roadways and other infrastructure responsive to outputs of the machine-learning models, particularly at higher levels of the hierarchy. In some cases, fleet operators (e.g., in trucking, ride-share platforms, or delivery services) may adjust routing of configuration of fleet over geographic areas responsive to outputs of the trained models. In some embodiments, geographic information systems may be enriched to encode attributes of road segments, intersections, and other places of interest inferred by the machine-learning models. In some embodiments, parts makers, like tier 1 parts makers, may adjust the configuration or design of parts based on outputs of the machine-learning models. In some cases, insurance companies and road-side service providers may customize offering for consumers and fleet operators based on outputs of the trained models.

FIG. 1 is a schematic diagram of a first computing environment in which various machine-learning infrastructure may be implemented with the present techniques in accordance with some embodiments. In some embodiments, the computing environment 100 may be configured to mitigate some of the above-described problems. For example, the computing environment 100 may be configured to mitigate various challenges associated with using computer systems to process vehicle data, like vehicle geolocation histories, vehicle sensor data streams, and the like. Some embodiments may use multi-layer hardware and software infrastructure to implement a multilayer vehicle learning infrastructure to receive vehicle sensor data and push control-system adjustments or other adjustment values based on machine-learning operations comprising sensor data from multiple vehicles, operator metrics stored in vehicle operator profiles, or features associated with geographic locations. In some embodiments, these vehicles may be in communication with an application executing on a local computing layer or on a top-view computing layer or cloud-based computing system via a cellular tower or other wireless base station. A wireless base station may be in wired communication with a data center or other computing device of a local computing layer. Alternatively, or in addition, the wireless base station may be in wired communication with a cloud-based computing application or service operating on a top-view computing layer. For example, the base stations may serve as access points on cellular or Wi-Fi™ networks for collections of sensor data of vehicles within wireless range of the respective base stations (e.g., in wireless ad hoc or centrally managed mesh networks). In some embodiments, the data center (or other computing device) used to compute results based on sensor data from one or more vehicles may further communicate additional results or application states to a centralized computing system or additional data centers as part of a cluster.

In some embodiments, a multilayer vehicle learning infrastructure may be implemented to provide adjustments to vehicle operations based on vehicle sensor data and associated geolocation data. In some embodiments, the multilayer vehicle learning infrastructure may ingest this streamed data and apply different machine-learning operations based on a respective computing layer, wherein results or application states may be communicated in varying degrees between different instances and across different computing layers. In some embodiments, the multilayer vehicle learning infrastructure may include the execution of different types of machine-learning operations and other computation operations at a vehicle computing layer, a local computing layer, and a top-view computing layer adapted to the resources and bandwidth limitations of each layer.

In some embodiments, a vehicle 102 traveling on a road 160 may include a suite of vehicle sensors 104. The vehicles sensors 104 may feed a large amount of diverse sensor data to a multilayer vehicle learning infrastructure that may infer various attributes about vehicles, vehicle operators, or places through which the vehicle travels based on this data. A large amount of data can include more than 50 Megabytes per mile or minute, more than 100 Megabytes per mile or minute, or more than 1 Gigabyte per mile or minute. In some embodiments, the sensor data can be concurrently obtained. A diverse amount of sensor data can include more than 5 types of sensor data, more than 10 types of sensor data, or more than 50 types of sensor data. These attributes can be combined to form vehicle profiles, operator profiles, or location profiles, each which are further described below and can be used to determine vehicle adjustment values. In some cases, the profiles may be implicit in trained machine-learning model parameters. In addition, these attributes can be combined to provide risk indicators for locations, vehicle types, or operator types, wherein vehicle adjustment values can be pushed to vehicles in response to one or more risk values meeting or exceeding a risk threshold.

The sensor data from the vehicle sensors 104 may include various types of data such as a geolocation, vehicle proximity data, control-system data, motion-based sensor data. Vehicle proximity data may include data about the proximity of objects near the vehicle as obtained using LIDAR, visual simultaneous localization and mapping, radar readings, or other depth-sensor readings. In some embodiments, vehicle proximity data for the proximity of objects may include an object classification selected from an ontology of objects such as bikes, pedestrians, cars, trucks, motorcycles, stop signs, and the like. The vehicle proximity data may also include use of an object orientation ontology to classify the orientation or pose of one or more objects relative to the vehicle, the movement or acceleration vectors of that orientation or pose, and the like.

Control-system data may include data about components of the vehicle that are directly controlled by a vehicle operator. The control system of a vehicle may include any component of a that directly controls the operations of one or more of elements the vehicle. For example, a control system may include components such as a steering wheel, brake pedal, accelerator pedal, turn signal switch, light switch, and the like. A control system can include virtual elements displayed on a screen or augmented/virtual reality glasses, wherein interaction between an operator and the virtual elements controls an operation of the vehicle. Control-system data may include data such as a steering wheel angular velocity, cruise control speed, adaptive cruise control behavior selection, applied braking force, whether or not a turn signal is activated, and the like.

Motion-based sensor data may include any data representing physical motion of a vehicle or a component of the vehicle that can be captured by a motion sensor. Motion sensors may include devices such as an accelerometer, gyroscope sensor, compass, barometer, light-emitting diode (LED) motion sensor, ultrasonic motion sensor, infrared motion sensor, or other motion-sensing devices. Motion-based sensor data may include vehicle velocity, vehicle acceleration, a vehicle turn radius, vehicle impulse, wheel slippage, and the like. For example, motion-based sensor data can include a motion profile such as an acceleration profile that includes a set of acceleration readings made by an accelerometer over a time period.

Vehicle operations data may include data about an operational status or condition of a vehicle, a component of the vehicle, or a set of components of the vehicle. Vehicle operations data may be acquired using a variety of sensors, such as the sensors described above. Other vehicle operations data may be acquired with a temperature sensor, chemical sensor, resistivity sensor, and the like. For example, the vehicle may include diagnostic data such as the temperature of one or more fluids in the vehicle, a fuel-air ratio, the presence or concentration of oxygen in a car exhaust, the rotations per minute, gear, tire pressure, battery state for electrics, and the like.

For example, after seeing of an anomalous object 110, an operator of the vehicle 102 may activate a turn signal, rotate a steering wheel, and press a brake pedal to decelerate the vehicle. Control-system data in this example may include values such as an angular rotation of the steering wheel during the turning or the force profile (e.g. force in Newtons over time) on the brake pedal during deceleration. Motion-based data in this example may include values such as a vehicle speed during the deceleration or the turn radius of the vehicle. Vehicle operations data may include values such as the loss in electric power from the turn signal and an engine temperature measurement.

Vehicle sensors can sense various other types of information such as locations, vehicle condition, vehicle operator statuses or distances to objects in the vehicle's environment. For example, some channels of sensor data may be expressed as a point cloud of vectors with an origin corresponding to the vehicle's location. Vehicle sensors may include LIDAR, radar, or ultrasonic sensors. In addition, or alternatively, some embodiments may include one or more types of optical cameras, wherein optical cameras may include stereoscopic arrays of cameras or other spatially arrayed arrangements of cameras. The optical cameras may provide sensor data for one or more processes to determine results indicating a geometry of the vehicle's surrounding environment based upon variation in coloration, focus, parallax, projected structured light location, occlusion, or the like in different video feeds from the different optical cameras.

Some embodiments may include, as on-board vehicle sensors, satellite navigation sensors such as global positioning system (GPS) sensors, Global Navigation Satellite System (GLONASS) sensors, Galileo sensors, etc. to provide one or more geolocations. Some embodiments may further include various radios configured to sense beacons from terrestrial transmitters, like cell towers or WiFi™ access points, and location sensors on these vehicles may be configured to triangulate a vehicle's position based on such signals.

Some embodiments may include, as on-board vehicle sensors, one or more temperature sensors (e.g., for air intake and exhaust), barometric pressure sensors, wind speed sensors, road roughness sensors, sensors to detect a distance to adjacent vehicles, light intensity sensors, inertia sensors, sensors to perform dead reckoning based on measured wheel rotations, compasses, and the like. Examples further include sensors informing OBD-II diagnostic state.

The vehicle 102 may include an onboard computing device 106 having one or more processors to perform computations on the sensor data. In some cases, the computing device is distributed on the vehicle, e.g., with a collection of processors operating on data from various sub-systems, like a braking sub-system, a transmission sub-system, a vehicle entertainment sub-system, a vehicle navigation sub-system, a suspension sub-system, and the like.

The onboard computing device 106 may use the computation results to perform one or more tasks, store the computation results in a vehicle profile or operator profile, or transmit them to another computation layer. The vehicle profile and operator profile can be any records or set of records representing dynamic and static information about a vehicle or operator, respectively. The vehicle profile may include records indicative of miles driven, types of roads and other street obstacles encountered, driver behavior while operating the vehicle, and the like. For example, a vehicle profile can store a timestamped history of sudden swerves, objects detected to be within 10 centimeters of the vehicle, and sudden decelerations in an event log. Similarly, an operator profile may include various information about an event history of a vehicle operator with respect to one or more vehicles. In some embodiments, the one or more vehicles may include one or more processors executing as a part of a vehicle computing layer. For example, an operator profile event log may be stored as an array of strings, wherein each entry in the array may include at a vehicle identifier and timestamp in conjunction with other pertinent operational events such as "vehicle ILVICCRMND04; 2020-05-05 12:01; drove 3.5 hours no incident."

The sensor data can include unprocessed sensor data such as un-transformed digital data or analog data. For example, the sensor data can include an array of values representing distances detected using a LIDAR laser array and a steering wheel angular velocity. The sensor data can also include derived sensor data, wherein derived sensor data is determined based on other sensor data. The derived sensor data can be stored in a purely numerical or unsorted array form. Alternatively, or in addition, the derived sensor data can be transformed into an ordered or structured form, such as a timestamped geolocation. For example, a timestamped geolocation can include an array, wherein a first entry in the array represents latitude, a second entry in the array represents a longitude, a third entry in the array represents a time of recording, and a fourth entry in the array represent a confidence radius centered around the latitude and longitude, wherein the confidence radius may be based on the confidence in a GPS sensor.

Some embodiments may receive derived sensor data determined using one or more built-in sensor-level processing systems. For example, a vehicle sensor may include an inertial measurement unit (IMU) (e.g., a three or six-axis IMU) that may provide a numeric value representing a measured force as an unprocessed sensor data, and also provide a classification value indicating that the measured force satisfies a threshold value indicating that the force is indicative of a potentially-fatal collision. Alternatively, or in addition, some embodiments may generate derived sensor data based on unprocessed sensor data or previously-derived sensor data, as further described below.

The onboard computing device 106 may execute a vehicle agent 108, wherein the vehicle agent 108 may be an application and can act as a listener for sensor data. The agent 108 may act as a listener by waiting for one or more events and perform a set of tasks in response to the one or more events occurring. For example, the event can include receiving unprocessed sensor data or processed sensor data, and the agent 108 may store sensor data or perform computations in response. Alternatively, or in addition, the agent 108 may poll a set of sensor data, devices, or other applications to acquire sensor data. The vehicle agent 108 may perform tasks such as data compression, feature reduction, noise reduction, privacy filtering, machine-learning training operations, and machine-learning prediction operations. As further described below, the agent 108 may be part of a distributed vehicular data processing suite. The vehicular data processing suite may include a self-updating, dynamic set of algorithmic implementations of learning models which may partially execute on the onboard computing device 106. Portions of the vehicular data processing suite may also execute on a local computing layer or top-view computing layer, as further described below.

In some embodiments, the onboard computing device 106 may receive a plurality of channels of sensor data from a plurality of sensors, e.g., more than 10, more than 20, and in many expected commercially relevant use cases, more than 50. In some cases, each channel may include one or more streams of values that vary over time to encode various endogenous or exogenous aspects of the vehicle or its environment, respectively. In some cases, the values are associated with one another by the device 106 across sensors based on the time at which the values are received or timestamps thereon. Some embodiments may group sensor values in temporal buckets, e.g., grouping values based on the most recent state every 10 ms, every 50 ms, every 500 ms, or more or less often. In some embodiments, one or more machine-learning models executed by the onboard computing device 106 may output one or more channels of results based on various subsets of these input channels.

Computations and related activities may be performed the vehicle agent 108, wherein the vehicle agent 108 can be part of the vehicle computing layer of a multilayer vehicle learning infrastructure. While certain algorithms and tasks are described below as being performed by an agent being executed on a vehicle computing layer of the multilayer vehicle learning infrastructure, some embodiments may perform these algorithms and other tasks at other layers of the multilayer vehicle learning infrastructure. For example, while this disclosure discusses an embodiment that uses an autoencoder executing on a vehicle computing layer to reduce the feature space of sensor data, other disclosures may use an autoencoder executing on a local computing layer to reduce the feature space of data being transmitted from the local computing layer. As further described below, the vehicle agent 108 may perform one or more various tasks related to processing sensor data, analyzing sensor data and executing action in response to the sensor data analysis result.

Some embodiments may implement lossless data compression methods such as Run-length encoding, Lempel-Ziv compression methods, Huffman coding methods or arithmetic coding methods. For example, one or more processors attached to a vehicle may apply the Lempel-Ziv 77 algorithm to perform a lossless compression of geolocation data by scanning the geolocation data with a sliding window. Alternatively, one or more processors attached to a vehicle may implement lossy methods for data compression such as transform coding methods, discrete cosine transforms, discrete wavelet transforms, or fractal compression.

Some embodiments may use one or more agents executing on the vehicle computing layer to perform a machine-learning operation. In some embodiments, the machine-learning operation may comprise a training operation to use sensor data as an input with the goal of minimizing an objective function. For example, some embodiments may apply a machine-learning operation trained to predict the response profile of a braking event in response to the detection of an object or an arrival at a particular geolocation using a gradient descent method (e.g. batch gradient descent, stochastic gradient descent, etc.) to minimize an objective function. As another example, some embodiments may apply a machine-learning operation trained to predict the riskiest or most operationally vulnerable portion of a vehicle based on sensor data comprising internal engine temperature and pressure sensors, motion-based sensors, and control-system sensors.

As further described below, results of a machine-learning operation can include the output of the machine-learning operation or state values of the machine-learning operation itself. For example, a machine-learning operation result may include a predicted acceleration pattern and the particular hyperparameters, perceptron weights or biases used in a neural network of the machine-learning operation. Machine-learning results may be used to initiate or modulate a start, stop, or change in vehicle operations. For example, the vehicle agent 108 may use LIDAR sensor data to detect and classify the presence of an anomalous object 110 and play a visual and auditory warning message based on a classification of the anomalous object 110 as a high-risk object. Machine-learning results may also be transmitted to a data center or other computing device in a local computing layer. Furthermore, these machine-learning results may be compressed, reduced, or encrypted before transmission. In some cases, the training is on-board, or some embodiments may offload training or obtain some or all model parameters via transfer learning.

Some embodiments may generate or update a vehicle profile or an operator profile that includes vehicle data or operator data equal to or based on machine-learning results. As further discussed below, updating a vehicle profile may include generating a new vehicle profile, adding information to an existing vehicle profile, merging two vehicle profiles to form a single vehicle profile, or deleting a vehicle profile. Similarly, updating an operator profile may include generating a new operator profile, adding information to an existing operator profile, merging two operator profiles to form a single operator profile, or deleting an operator profile.

In some embodiments, a vehicle profile or associated operator profile may indicate an increased risk of accident when its corresponding vehicle is traveling through a particular road or road type associated with detrimental conditions. In some embodiments, a vehicle profile may be responsive to specific vehicle operators and have different risk values based on the operator profile or operator type of the operator currently using the vehicle. In some embodiments, these risk values may be normalized based on a distribution of the values for a population at the corresponding place. For example, some embodiments may include an operator profile for a vehicle that reports that an operator turns a vehicle faster than 95% of other vehicles on a particular corner or brakes sooner than 80% of other vehicles at a particular intersection.

In some embodiments, either or both a vehicle profile and an operator profile may include a set of associated geolocations forming a path of travel, wherein terminal ends of the path of the travel may be associated with other data. For example, as the vehicle 102 travels down the road 160, the terminal ends of a path along the road 160 may indicate an association with an online account owned by the vehicle operator. As further described below, some embodiments may selectively cluster or up-weight the geolocations of these terminal ends associated with the beginning or end of trips during certain computations, such as to filter out non-terminal data points. Some embodiments may detect terminal ends based on a vehicle sensor detecting less than a threshold amount of speed or less than a threshold amount of movement over greater than a threshold duration of time.

In some embodiments, data provided by a set of sensors attached to a first vehicle may be used to provide information about a second vehicle, wherein the second vehicle may be stored with its own vehicle profile. For example, the vehicle sensors 104 include a camera that can capture an image, video, or audio recording of a second vehicle 192. The vehicle agent 108 may analyze the one or more recordings, create a second vehicle profile for the second vehicle 192, and store analysis results in the second vehicle profile. The second vehicle profile may include one or more values representing a feature of the second vehicle such as a scanned image, vehicle shape, vehicle color, license plate, or the like. The vehicle agent 108 can store the second vehicle profile in a non-transitory, computer-readable medium in the onboard computing device 106 or transmit the second vehicle profile to a base station 120. As further described below, the vehicle profiles generated by a plurality of vehicles for a same detected vehicle may be merged to form a single vehicle profile corresponding to the detected vehicle, even in cases wherein the detected vehicle itself does not have any sensor outputs or is not transmitting data from sensors.

In some embodiments, one or more onboard computing devices of vehicles may be part of the vehicle computing layer of a multilayer vehicle learning infrastructure. In some embodiments, an agent may perform a training activity and send results of the training activity to a subsequent infrastructure layer as part of a federated learning (FL) architecture. For example, each of a set of computing devices attached to one of a corresponding set of vehicles may be part of a FL population of devices assigned to perform a training operation or other machine-learning operation. Training weights, training results, or other results from one or more agents may be sent to a subsequent layer during a FL round without exposing the data used for training to any other agent on the same layer. As further described below, these values can be used to improve the accuracy and computation speed of vehicle computing layer agents or provide instructions for control-system adjustments. The use of a FL method can improve operator and vehicle privacy while maintaining a high degree of predictive power for any trained machine-learning model.

The vehicle 102 includes a wireless network interface 105 having a radio by which the vehicle may send data to and receives data from one or more servers via the base station 120 during a wireless data session 109. The sent data may include either or both the unprocessed sensor data provided by the set of vehicle sensors 104 or analysis results generated from the one or more vehicle agents 108, wherein the data may be encrypted, compressed, or feature-reduced. In some embodiments, the servers may be hosted by makers of the vehicle, providers of equipment used in the vehicle, or various other third parties. In some embodiments, the radio may be a cellular radio by which data is communicated during a wireless data session between cellular base stations and the vehicle. In some embodiments, the radio includes a satellite radio configured to communicate via various low Earth orbit or higher orbit satellite networks.

Roadside sensors 134 are shown attached to a roadside device 130. A roadside sensor may be any sensor that is close enough to one or more roads to capture a visual, auditory, or other feature of the one or more roads (e.g., sensing cars on the roads). Some embodiments may include roadside sensors to provide roadside sensor data that further improve the predictive performance of a multilayer vehicle learning system. A roadside sensor may obtain roadside sensor data, which may include but are not limited to temperature values, pressure values, humidity values, still images, video feed stream, audio stream, three-dimensional range-finding streams from one or more cameras on a traffic light, and the like. In some embodiments, the data collected by the roadside sensors 134 may be used to verify data collected by individual vehicles in the vehicle computing layer, such as the vehicle 102. This data can be used by computing devices to perform modeling validation to verify sensor data transmitted by individual vehicles.

In some embodiments, the roadside device 130 may capture an image, video, or sound of or otherwise associated with a vehicle or object. For example, the roadside sensors 134 may capture an image, video, or sound associated with both the vehicle 102 and the anomalous object 110. As further described below, roadside sensor data can be used by a roadside agent 138 executing on one or more processors of a roadside computing device 132 to perform machine-learning operations. For example, the roadside agent 138 may classify moving objects as corresponding to vehicles, pedestrians, wildlife, etc. based on a video stream. Furthermore, some embodiments may correlate geolocation data provided by vehicles and known roadside device locations to further aid classification of events that correlate with anomalous vehicle behaviors. For example, the roadside agent 138 may analyze a video stream captured by the roadside sensors 134 in conjunction with vehicle geolocation data provided by the vehicle 102 to detect the anomalous object 110.

In some embodiments, the vehicle computing device 106 may first label the anomalous object 110, and the local computing data center 122 may label the anomalous object 110 based on a visual recording captured by the roadside sensors 134. A local application executing on the local computing data center 122 may then recognize that the geolocations of the roadside sensors 134 are close the geolocations of the vehicle 102 and analyze detected features. The application may compare properties assigned to the feature based on a characterized shape, an estimated size, coloration, and other quantifiable or categorizable values, and, in some embodiments determine that the two features are physically connected (e.g. parts of a same larger component, different views of the same component, etc.).

The roadside device 130 may send data to a local computing layer using methods similar to those used by the vehicle 102. For example, the roadside device 130 can send roadside data or results based on the roadside data to the base station 120 via a wireless data session 139. Alternatively, some embodiments may allow the roadside device 130 to transmit and receive data from the local computing data center 122 via a wired communication network. Alternatively, or in addition, the roadside device may send roadside device data to a cloud computing application 140 in some embodiments, wherein the cloud computing application 140 is part of the top-view computing layer.

The data transmitted from the vehicle computing layer may be communicated to a local application executing on the local computing data center 122 of a local computing layer via the base station 120. In some embodiments, the local application may be or include instructions to execute a local computing agent 128 executing on the local computing data center 122. The local computing agent 128 may analyze the data from the vehicle computing layer. Some embodiments may transmit at least a portion of the sensor data using a standardized interface such as Sensoris. Alternatively, or in addition, some embodiments may transmit at least portion of the sensor data using other interface standards or using interface standards that are determined and communicated during the transmission of the sensor data itself. As further described below, various wireless systems, protocols, or devices may be used to send results from the vehicle computing layer to the local computing layer.

In some embodiments, the data center 122 may obtain a first visual record of the second vehicle 192 obtained by the vehicle sensors 104 and perform a machine-learning operation on the first visual record to quantify or otherwise record features of the second vehicle 192. For example, some embodiments may apply OCR and an image-based machine-learning method to determine car shape and car color before mapping these features to a new vehicle profile. Some embodiments may obtain a second visual recording to the second vehicle 192, such as by one captured using the roadside sensors 134, wherein another machine-learning operation may be applied to capture features from the second visual recording and mapping them to a fourth vehicle profile. In some embodiments, a local application executing on the data center 122 may recognize a similarity in geolocations during capture of the vehicle and compare the third and fourth vehicle profile based on their mapped features. The local application executing on the data center 122 may then determine that the third vehicle profile and fourth vehicle profile correspond to the same second vehicle 192 based on these similar or identical mapped features and merge these profiles. In some embodiments, a vehicle profile corresponding to the second vehicle 192 may be marked as stolen, dangerous, or otherwise satisfies a vehicle risk warning threshold. In some embodiments, a warning may be displayed in the interior of the first vehicle 102 that warns occupants in the first vehicle 102 about a risk value associated with the second vehicle 192.

The data processed by some embodiments may be relatively large in scale, in terms of bandwidth, processing complexity, and memory complexity. In some cases, the number of vehicles reporting data to a data center in a local computing layer or a top-view application in a top-view computing layer may be more than 100, more than 1000, more than 1 million, more than 10 million, or more than 100 million vehicles. In some embodiments, the number of sensors on each vehicle may exceed more than one, more than five, more than 10 or more than 50. In some embodiments, each vehicle may include more than 5, 10, or 20 different types of sensors, in some cases with multiple instances of the same type of sensor monitoring the vehicle or the vehicle's environment. In some embodiments, the vehicles in a vehicle computing layer may be heterogeneous. For example, the vehicles in a vehicle computing layer may include more than 10, more than 20, or more than 50 different types of vehicles or more than 2, more than 5, or more than 10 different model years. Additionally, or alternatively, the vehicles may include more than 5%, 10%, or 20% of the public's fleet of vehicles in use in the United States. In some cases, the geographic area over which the vehicles travel while reporting data to the multilayer vehicle learning system may be larger than 100 square kilometers (km), 10,000 square km, or the continental United States. To process data at this scale, some embodiments may implement concurrent processing frameworks, like Hadoop™, Apache Spark™, Apache Storm™, or Apache Flink™. Alternatively, or in addition, some embodiments may use data warehousing platforms such as Google BigQuery™, DataTorrent RTS™, or Apache Hydra™.

Some embodiments can use a deep learning system, such as deep neural networks, deep belief networks, recurrent neural networks (RNN), convolutional neural networks (CNN), hybrid neural networks, and the like. As further described below, deep learning systems can be used to determine various results for adjusting vehicles in the vehicle computing layer or for transmitting to other computing devices at a local computing layer or a top-view computing layer. Such results can include a quantitative result, a category label, a cluster, or other outputs from the output layer of a neural network. Such results can also include parameters or weights used by the neural network, such as weights generated during a training operation.

While deep learning systems may be used by vehicle computing devices in a vehicle computing layer, the computing layers described in this disclosure may reduce the advantages of performing computationally expensive operations on devices at the vehicle computing layer. For example, the local computing data center 122 of the local computing layer may have more computational resources available than the onboard computing device 106. This disparity may result in faster and more accurate computation results from the local computing layer. The results from the local computing layer may include control-system adjustment values that can be pushed back to the vehicles, wherein the control-system adjustment values can be used to perform an adjustment in the physical response in the vehicle to user control or automated control. Control-system adjustment values can affect a vehicle response to any operator-controlled change in the vehicle, such as a steering wheel turn, activating a headlight or turn signal, activating a cruise control system, using an antilock braking system (ABS), stepping on a vehicle accelerator, and the like. Control-system adjustment values can include a vehicle braking responsiveness, vehicle acceleration responsiveness, and steering wheel responsiveness during operator-controlled driving or cruise-control driving, wherein optimization of these parameters may be especially helpful for reducing accidents or otherwise harmful incidents.

The local computing agent 128 may update a vehicle profile for the vehicle 102 based computations performed by the local computing agent 128 that considers data from other vehicles. For example, the local computing agent 128 may update a vehicle profile to include a tag that indicates that the vehicle 102 is driven an average of 10% faster when traveling along the road 160 compared to a median driving speed of all vehicles traveling along to the road 160 and make a similar update to an operator profile. In some embodiments, attributes of places through which a vehicle travels may be accessed and used to update its corresponding vehicle profile. For example, a vehicle profile may indicate a greater amount of accumulated degradation in response to detecting that the vehicle 102 is traveling through a location indicated as having rough roads based on analysis using sensor data from a plurality of vehicles. As another example, the vehicle profile for the vehicle 102 may be updated to increase its wear and tear value in response to a determination that the vehicle 102 had traveled to a place associated with substances known to corrode vehicle components (e.g. salt, water-salt mixtures, acids, etc.).

In some embodiments, the vehicle profiles may be accessed to assess insurance risk or schedule preventative maintenance. In some embodiments, self-driving algorithms may be modified to reflect information the vehicle profiles, for instance, self-driving algorithms may be configured to implement less aggressive acceleration, cornering or deceleration responsive to an amount of wear and tear in the car or responsive to greater risk on a road, like at a corner, exit, on-ramp, or intersection. Similarly, one or more machine-learning operations performed by the multilayer vehicle learning system may be used to evaluate the riskiness or other performance of autonomous driving systems.

Results from the local computing layer computed using the local computing data center 122 may be further sent to a cloud computing application 140 executing on a top-view computing layer. The top-view computing layer may include or have access to one or more processors that execute a top-view computing agent 148, wherein the top-view computing agent 148 may be a top-view computing application that act as an overriding agent by communicating directly with vehicle agents and local computing agents, without intermediary communications between agents on other layers. The top-view computing agent 148 may perform any of the algorithms or tasks described above. In addition, the top-view computing agent 148 may perform region-wide analysis based on the data received from various data centers in a local computing layer. For example, the top-view computing agent 148 may predict outcome probabilities for entire populations of vehicles or vehicles operators across a region being serviced by numerous data centers operating simultaneously in the region. In some embodiments, the top-view computing agent 148 may determine risk values for regions, vehicle categories, or operator profiles. These risk values can then be correlated to specific incidents or vehicle designs to detect infrastructure optimization or vehicle design optimization.

Some embodiments may be configured to generate a location profile based upon data from individual vehicles reported from the vehicle computing layer or local computing layer. Some embodiments may use one or more top-view computing agents executing on the top-view computing layer to perform or more machine-learning operation based on data from a plurality of vehicles and data centers. For example, the top-view computing agent 148 may classify a road risk value based upon a set of event logs and geolocations provided by the vehicle profiles of vehicles. Additionally, the top-view computing agent 148 may determine that a road is a school zone and is in a congested state between the start and end of school hours based on a trained neural network that uses image data and a vehicle speed history as inputs. In response, the top-view computing agent 148 may elevate a road risk value associated with the road during those school hours.

Some embodiments may associate a risk value with a behavior, operator profile, or vehicle profile. For example, a top-view computing agent 148 may train or use a machine-learning system to determine a correlation relationship between the accident risk for vehicles and the average speed at which the vehicle is being driven. Alternatively, or in addition, some embodiments may determine a risk value associated with a vehicle starting location, vehicle destination, vehicle operator, vehicle operator type, specific vehicle, or vehicle type. For example, some embodiments may assign a risk value to a specific drive by a specific vehicle based on a predicted vehicle destination. Alternatively, or in addition, some embodiments may determine or update a risk value based on specific two-part relationships between a vehicle operator and a vehicle. Alternatively, or in addition, some embodiments may determine or update a risk value based on three-part relationships between vehicle operators using a specific vehicle to visit a specific place as determined based on a road network graph portion.

In some embodiments, one or more processors of the top-view computing layer may track, merge or associate a plurality of vehicle profiles and operator profiles. In some embodiments, a population of passengers carried by vehicles may be larger than one, two, three, or more times the number of vehicles. In addition, vehicle operators or passengers other than vehicle operators may occupy different vehicles at different times. In some embodiments, an agent executing on the local computing layer or top-view computing layer may calculate a probability associated with each user and vehicle pair.

Figure 2:
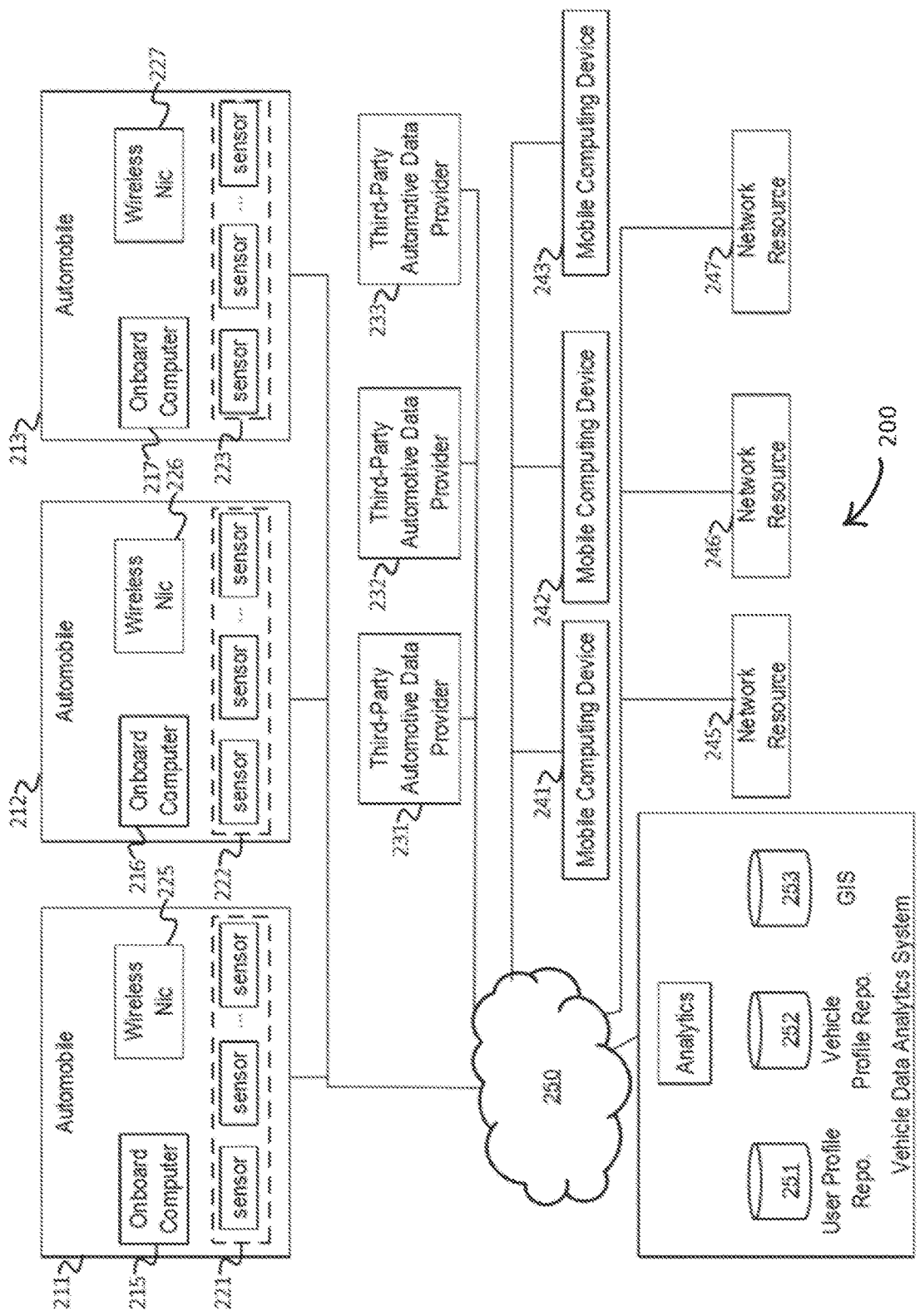
FIG. 2 is a logical-and-physical-architecture block diagram illustrating a computing environment in which various learning infrastructure may be implemented with the present techniques in accordance with some embodiments.

FIG. 2 illustrates a computing environment 200 in which various learning infrastructure in accordance with the present techniques may be implemented in accordance with some embodiments. In some cases, some or all of the above-describe techniques may be implemented in the computing environment 200. Each the vehicles 211-213 have one of the onboard computers 215-217, sets of sensors 221-223, and wireless network interface controllers (NICs) 225-227. Data collected by the sets of sensors 221-223 can be processed by one of the onboard computers 215-217 and wirelessly transmitted to a vehicle data analytics system 250. In addition, third party vehicle data providers 231-233 may provide additional data corresponding to one or more of the vehicles 211-213. Furthermore, network resources 245-247 may be accessed by a user when occupying one of the vehicles 211-213, wherein data derived from the network resources 245-247 may also be used as inputs for machine-learning operations to be performed by the vehicle data analytics system 250.

Some embodiments may include methods of linking operator records with user profiles or other information available from an online source. In some embodiments, operators or vehicle occupants may have various networked computing devices that they carry near or into a vehicle. As shown in FIG. 2, the networked computing device may be one of the mobile computing devices 241-243, wherein each of the mobile computing devices 241-243 may correspond with an operator or passenger of one of the vehicles 211-213. A mobile computing device can include a smart phone, a tablet, a laptop computer, or the like. A networked computing device may be a wearable computing device, such as a smart-watch, a head-mounted display, a fitness tracker, and the like. In some embodiments, these computing devices may include network interfaces, processors, memory, an OS, and various sensors, like a geolocation sensor or an IMU. In some embodiments, the machine-learning operations described above may use the data advertised by these various other networked computing devices as additional inputs.

In some embodiments, the computing environment 200 includes the vehicle data analytics system 250 configured to receive data from any of the above-described components. The vehicle data analytics system 250 may be executed on a single server of a local computing layer, a distributed computing network operating as part of a top-view computing layer, a cloud-based application on the top-view computing layer, some combination thereof In some embodiments, the vehicle data analytics system 250 may be configured to determine and store attributes of vehicles, vehicle operators, vehicle passengers, and places visited by those vehicles based on this data. As shown in FIG. 2, the vehicle data analytics system 250 may include a user profile repository 251, a vehicle profile repository 252 and a geographic information system (GIS) repository 253. The user profile repository 251 may store attributes about users such as vehicle operators or vehicle passengers. For example, the user profile repository 251 may store one or more operator profiles that includes one or more average driving speeds of the operator. The vehicle profile repository 252 may stores attributes about vehicles. For example, the repository 251 may store one or more vehicles profiles that includes a list of collisions and near-collisions detected for each corresponding vehicle. The geographic information system (GIS) repository 253 may store one or more road network graphs, attributes of places represented by the road network graphs, particular vehicle paths along the road network graph, and the like. For example, the GIS repository 253 may store a road network graph and traffic information corresponding to road segments on the road network graph.

Figure 3:
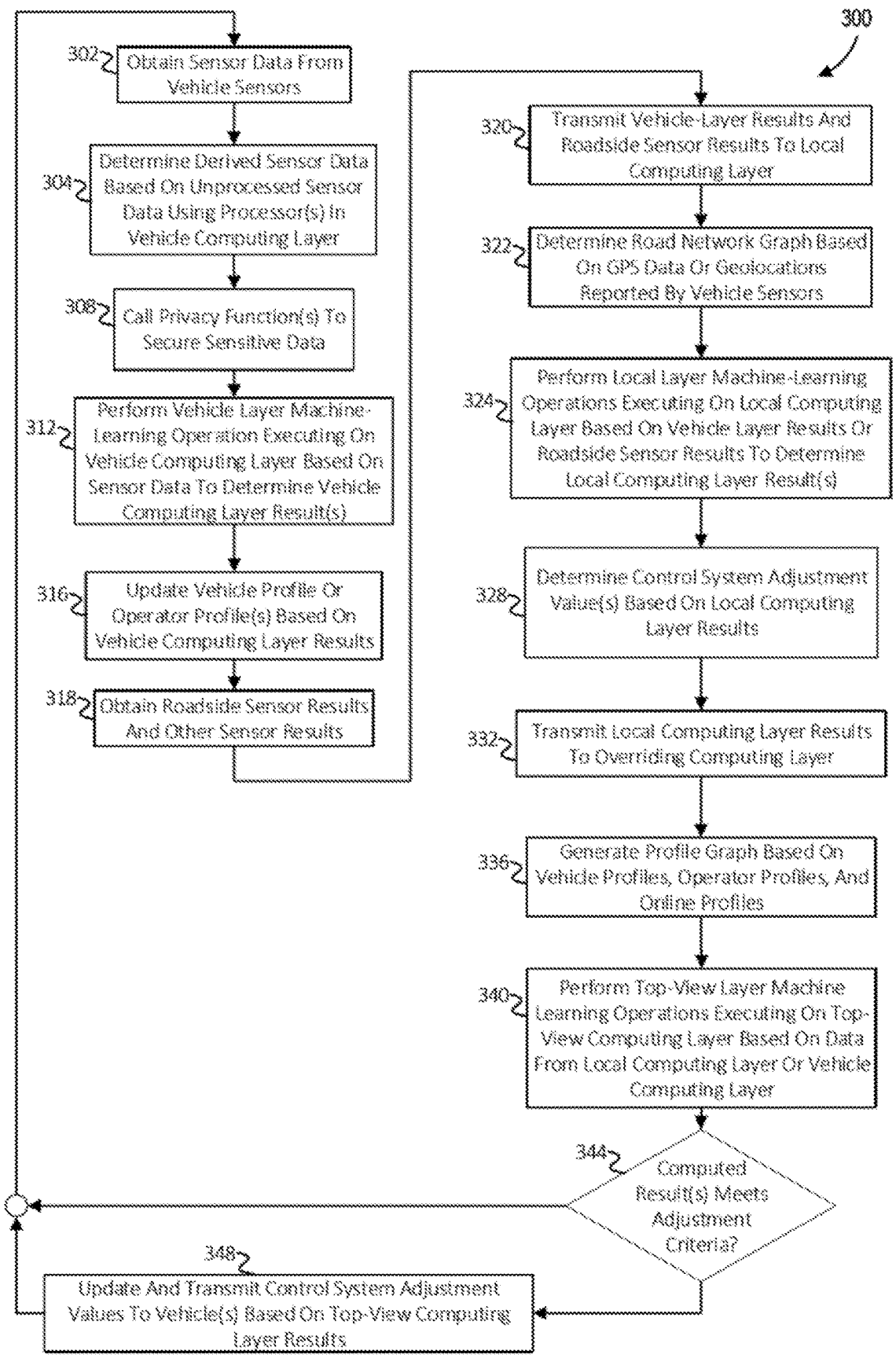
FIG. 3 is a flowchart of a process that may be implemented in the computing environments of FIG. 1 or 2 to compute results for vehicles in accordance with some embodiments.

FIG. 3 is a flowchart of a process 300 that may be implemented in the computing environments of FIG. 1 or 2 to compute results for vehicles in accordance with some embodiments. The process 300 depicts operations using a multilayer vehicle learning infrastructure to determine results for adjusting vehicle operations or otherwise affecting vehicle performance. In some embodiments, the multilayer vehicle learning infrastructure may execute one or more routines in the computing environments 100 or 200. In some embodiments, the various operations of the process 300 may be executed in a different order, operations may be omitted, operations may be replicated, additional operations may be included, some operations may be performed concurrently, some operations may be performed sequentially, and multiple instances of the process 300 may be executed concurrently, none of which is to suggest that any other description herein is limited to the arrangement described. In some embodiments, the operations of the process 300 may be effectuated by executing program code stored in one or more instances of a machine-readable non-transitory medium, which in some cases may include storing different subsets of the instructions on different physical embodiments of the medium and executing those different subsets with different processors, an arrangement that is consistent with use of the singular term "medium" herein.

In some embodiments, the process 300 includes receiving sensor data from vehicle sensors, as indicated by block 302. In some cases, this may include the above-describe set of vehicle sensors 104 gathering data about the vehicle 102 and the environment around the vehicle 102. These sensors can provide various types of sensor data, such as geolocations, motion-based sensor data, control-system sensor data, or other types of sensor data. For example, one or more sensors attached to a vehicle may include capturing images, videos, LIDAR measurements, audio measurements, airbag deployment, and the like. For example, a vehicle sensor may obtain vehicle geolocations, control-system data in the form of steering and ABS positions, and vehicle proximity data in the form of LIDAR data every 50 milliseconds over the course of a trip in the vehicle.

In addition, some embodiments may refine sensor data as part of implementing an active learning method. Some embodiments may display a query to a vehicle operator after the detection of a potentially risky behavior. For example, after a detected swerve event, the vehicle may display a question of whether a collision was avoided and whether the operator felt appropriate warning was provided by the vehicle's LIDAR system. As further described below, a query response may be sent to a local application executing on a local computing data center of a local computing layer, wherein the query response may be incorporated in an active learning system for machine-learning applications.

Some embodiments may determine derived sensor data based on unprocessed sensor data using one or more processors in a vehicle of the vehicle computing layer, as indicated by block 304. In some embodiments, as the vehicle 102 of FIG. 1 moves along a route, various digital values or numerical values collected by vehicle sensors may be collected and analyzed to determine derived sensor information. For example, some embodiments may include using a LIDAR-adapted application executing on one or more processors to receive a numerical array of values representing LIDAR readings and generate an event record indicating that a human-shaped object was within a threshold distance of the vehicle. Some embodiments may also associate any combination of un-processed sensor data or derived sensor data to form additional derived sensor data.

Some embodiments may call one or more privacy functions to secure sensitive data, as indicated by block 308. Sensitive data may include various information about a vehicle operator that may be used to identify the vehicle operator. Sensitive data may also include sensor data or vehicle data that may be proprietary or otherwise confidential. In some embodiments, applying a privacy operation may include encrypting, modifying or removing specific types of data from sensor data or other data collected about a vehicle, vehicle operator, vehicle passenger, or object in the vehicle. In some embodiments, calling one or more privacy functions can increase the resistance of individual vehicles to exploitation by malicious entities.

Some privacy functions may include operations to delete identifying data after using it. A privacy function can delete data such as audio recordings of the vehicle occupants, video recordings of the vehicle occupants, images of vehicle occupants, other biometrics of vehicle occupants, names, identification numbers, gender labels, age identifiers, race labels, and the like. For example, after generating and storing an indicator that the operator was facing a windshield while driving, the video recording itself may be modified or deleted from a memory by calling the privacy function.

Some embodiments may inject noise into sensor data (or data derived or otherwise inferred therefrom), such as by using a noise-injecting mask while performing a differential privacy operation on sensor data. For example, sensor data such as an acceleration log, destination coordinates, or vehicle operator appearance may be altered by a privacy-driven noise term. A privacy-driven noise term may be determined using the value from a probability distribution, wherein the same probability distribution (or defining characteristics thereof) are available to an application that uses the sensor data to perform computations executing on a layer other than the vehicle computing layer. Example probability distributions may include a Gaussian distribution, Laplace distribution, uniform distribution, or the like. By using noise injection to change the sensor data or sensor data results from an initial set of values to a masked set of values, some embodiments may reduce the probability of tracking specific data back to a specific vehicle or specific vehicle operator, since each vehicle sending data may have its own known amount of injected noise that is different from the amount of injected noise for other vehicles. Furthermore, noise injection operations may be used in conjunction with a FL method, as further described below.

Some embodiments may include encryption methods adapted for machine-learning methods. Example encryption methods may include partially homomorphic encryption methods based on cryptosystems such as Rivest-Shamir-Adleman (RSA), Paillier, ElGamal, and the like. Example encryption methods may also include fully homomorphic encryption methods based on cryptosystems such as Gentry, NTRU, Gentry-Sahai-Waters (GSW), FHEW, TFHE, and the like. Some embodiments may implement a fully homomorphic encryption method to increase robustness and adaptability with machine-learning operations described further below or increase resistance to attacks from quantum computing systems.

Some embodiments may execute a smart contract configured to receive a request to access data of a vehicle or operator profile, and some embodiments may determine whether that request is authorized. Some embodiments may determine whether the request is authorized based on whether it is associated with (e.g., contains) a cryptographically signed value that has been signed by a private cryptographic key of an individual corresponding to that data or a delegate of that individual. Some embodiments may determine whether the cryptographic signature corresponds to the individual or the delegate based on a public cryptographic key of that individual or delegate. Upon determining that the keys correspond, some embodiments may send a record that affords access to the requested data, such as a cryptographic key by which the data may be decrypted or the data itself. In some embodiments, the sent cryptographic key or the data may be encrypted with a public cryptographic key of the requestor, such that the requester may access the values in the ciphertext with their private cryptographic key. Some embodiments may require multiparty signatures to provide access to data. For instance, some smart contracts may require that both the individual described by the data and a provider of the data provider (like a car maker or fleet owner) approves a request in order to access secured data.

Some embodiments may include performing a vehicle layer machine-learning operation executing on a vehicle computing layer to generate vehicle computing layer results based on the sensor data, as indicated by block 312. In some embodiments, performing the vehicle layer machine-learning operation may include using an agent executing on one or more processors in the vehicle computing layer. The agent may implement a machine-learning method to perform dimension/feature-reducing tasks such as by using a neural network in the form of an autoencoder, wherein an autoencoder is a neural network system comprising an encoder layer and a decoder layer. The total number of nodes of the autoencoder's input layer is equal to a total number of nodes of the autoencoder's output layer. For example, one or more processors of a vehicle can be used to train an autoencoder of the agent on unprocessed LIDAR data. Once trained, the trained autoencoder can reduce the unprocessed LIDAR data into a reduced form that requires less data to represent and also includes less noise than the unprocessed LIDAR data. Some embodiments may analyze these reduced parameters to form an efficient ontology of sensor data. For example, some embodiments can recognize that an autoencoder reduces the data from 20 different sensors such that 95% of the values come from 5 sensors. In response, some embodiments may provide instructions to transmit only data from these 5 sensors. In some embodiments, additional sensors may be attached to the vehicle to provide additional sensor data, wherein the additional sensor data may be consumed by the agent to generated results for use or further consumption. In some embodiments, the agent may perform an additional training operation to re-train machine-learning weights, parameters, and other values after the additional sensor data is provided.

In some embodiments, the vehicle layer machine-learning operation may comprise a training operation using sensor data, wherein the training operation can include a supervised learning operation based on an objective function. In some embodiments, the supervised learning operation, may include treating sensor data as an input with the goal of minimizing an objective function. The objective function may characterize an aggregate difference between one or more outputs of a machine-learning system and the known values of a training dataset. For example, some embodiments may train a vehicle layer machine-learning system comprising a multilayer (e.g., 2 or more, 5 or more, or 50 or more) network of perceptrons to predict a user reaction time using the vehicle proximity data as inputs and using a gradient descent method to optimize for the objective function. The objective function for this example may be equal to a difference between the measured reaction time based on braking information and predicted reaction time generated using the machine-learning system. Various other predictions can be made using supervised learning operation, such as predictions about braking duration or a maximum steering wheel angular position made by a vehicle operator during a turn.

Alternatively, or in addition, the vehicle layer machine-learning operation may comprise using a trained machine-learning system or unsupervised machine-learning system to determine an output. For example, some embodiments may use a trained neural network to predict the duration of a braking event in response to the detection of an object or an arrival at a destination geolocation. Alternatively, or in addition, vehicle layer machine-learning operation may include using an unsupervised machine-learning system. For example, sensor data comprising braking information and vehicle proximity may be analyzed using a deep belief neural network, wherein the deep belief neural network may comprising series of unsupervised networks such as autoencoders or restricted Boltzmann machines. In this example, these outputs can be distinguished into data clusters, and further operations can include classifying these data clusters expected braking events and unexpected braking events.

Whether a vehicle layer machine-learning operation is a training operation or an operation to use a trained system may depend on whether a training mode is activated. In some embodiments, a plurality of machine-learning operations may occur simultaneously, wherein at least one of the plurality of machine-learning operations is a training operation and at least one another of the plurality of machine-learning operations is an operation to use a trained system.

In some embodiments, the vehicle layer machine-learning operation may determine a sensor inconsistency based a machine-learning-driven analysis of sensor data. In some embodiments, a neural network may be trained to perform self-diagnostic tests based on idle vehicle behavior and driving vehicle behavior to detect a defective sensor that did not self-report as defective. For example, a driver may swerve to avoid an object that a LIDAR sensor did not detect. An application executing on a vehicle computing device may first detect that a swerve event occurred based on a steering wheel angular velocity and use a trained machine-learning system that uses sensor data (e.g. steering wheel velocity, turn signal inputs, and other car sensor data) to determine as inputs to determine the likelihood that a collision avoidance event had occurred. The application may then confirm the occurrence of the collision avoidance event with a query to the driver. Upon confirmation that the collision avoidance event occurred, the vehicle application may perform various responsive tasks, including but not limited to instructing other machine-learning systems to re-train sensors without using the LIDAR sensor as an input, sending a warning to a vehicle operator that the LIDAR system may be defective, or transmitting instructions to a local computing layer or top-view computing layer to ignore LIDAR data from the vehicle.

As further described below, results of a machine-learning operation can include the outputs of the machine-learning operation and particular state values of the machine-learning operation. For example, the machine-learning results of a machine-learning operation may include both a predicted acceleration pattern and the perceptron weights or biases used in a neural network of the machine-learning operation. These machine-learning results can then be processed for further use or for transmission to a data center in a local computing layer. In some embodiments, the machine-learning operation may comprise training a neural network to perform a classification task, wherein one or more training classifications are based on a response made by an operator to a query generated during an active learning operation. In some embodiments, this machine-learning operation may be performed in sequence with the autoencoder operation described above.

In some embodiments, a vehicle computing device may determine a baseline threshold region for a vehicle based on data from the vehicle's set of sensors. The baseline threshold region may be represented by a specific set of values, weighted sum, a weighted product, a range of values, multidimensional region in a measurement space, etc. For example, the baseline threshold region may be represented by a combination of a velocity range and a temperature range represented by a function dependent on the velocity. The baseline threshold region may represent a region the measurement space of the sensors that represents normal, non-anomalous vehicle and sensor function. In some embodiments, a determination may be made of whether this baseline threshold region is exceeded by an abnormal sensor measurement. In cases where this determination is made, some embodiments may find one or more defective sensors based on a review of sensor history or through the use data triangulation, wherein the diversity of data allows for defects or failures in one or more sensors to be compensated. For example, some embodiments may determine that an engine temperature sensor is faulty after a determination that a baseline threshold region is exceeded. In response, some embodiments may display a message indicating the faultiness of the temperature sensor or transmit instructions to the local computing layer or directly to the top-view computing layer to discard data from the temperature sensor.

In some embodiments, an agent may use the machine-learning operation to analyze sensor data and generate results to adjust a vehicle control system or to transmit the results to a base station, server operating on a data center, cloud computing service, serverless application, or the like. For example, the agent may include one or more algorithms to detect an angular acceleration of a vehicle steering wheel and categorize the event as a swerve or not a lane change. The agent then may produce an event record to indicate which category the angular acceleration event fell under and associate this event coupled with an event time with a vehicle profile of the vehicle, wherein the vehicle profile includes the event record in an event log. Other event records can include a pot-hole avoidance event, a pot-hole strike event, a swerve event, a hard acceleration event, a lane change event, or an off-road heading change event. As further described below, results from the agents of individual vehicles can be combined and associated with one or more features in a road network graph, wherein the feature can be represented by one or more indicators or values indicating a road status. Furthermore, some or all of the results may be processed using an encryption method similar or identical to the methods described above for block 308.

In some embodiments, the process 300 includes updating a vehicle profile or operator profile based on the vehicle computing layer results, as indicated by block 316. Some embodiments may update the vehicle profile by recording discrete events or event intervals in the vehicle profile in an event log, a multidimensional timeseries stream, a set of timestamped events, other timestamped data, any permutation of the above-describe types of entries, and the like. For example, some embodiments may record an event log entry that includes a label "bicycle," an angle value "30," a distance value "0.15," and a timestamp value, wherein the entry indicates that a bicycle has been detected 0.15 meters away from the vehicle at an angle of 30 degrees from the front of the vehicle at the time corresponding with the timestamp value. Some embodiments may record static values in the record profile, such as a vehicle identification number, an engine type, vehicle type, and the like. For example, some embodiments may record that a vehicle is an electric vehicle for its corresponding vehicle profile.

Some embodiments may update an operator profile for vehicle operators based upon their operation of different vehicles and other operator information. As discussed above, some embodiments may include calling one or more privacy functions to remove, add noise to, or otherwise anonymize identifying information about a vehicle operator before recording information about the vehicle operator. In some cases, such as when a privacy function prevents use of any pre-existing identifier values for a vehicle operator, some embodiments may generate a new operator profile and corresponding operator profile identifier. Some embodiments may characterize the operator profile based upon the operator's driving behavior for a vehicle. Some embodiments may associate more than one operator profile with a vehicle. For example, some embodiments may create and characterize a first operator profile based on operator metrics such as an average or range of vehicle speeds, average or range of vehicle acceleration, average or range of vehicle deceleration, average or range of vehicle quartering speeds, average or range of vehicle driving time, and the like, and create a second operator profile based on a detected difference in one or more operator metrics.

In addition, some embodiments may merge or otherwise link different operator profiles based upon a mutual association with a same vehicle or vehicle profile. For example, some embodiments may merge a first operator profile with a second operator profile based on a determination that two operator profiles include a same vehicle in a vehicle history entry and share recorded events in their event log. Furthermore, some or all of the profiles may be processed using an encryption method similar or identical to the methods described above for block 308.

In some embodiments, the process 300 includes obtaining roadside sensor data from roadside sensors, as indicated by block 318. In some cases, this may include using the roadside sensors 134 shown in FIG. 1 to collect roadside data. Roadside sensors can provide additional values for determining road features, identify vehicles or other objects, or provide road information even without the presence of vehicles. Similar to the methods described for blocks 304 to 316 for sensor data from vehicle sensors, roadside sensor data can be encrypted, dimensionally reduced, and analyzed to provide additional data for machine-learning operations in a local computing layer. For example, one or more processors of a local computing layer may examine a visual recording to detect and label a roadside feature.

Roadside sensors, like traffic cameras, traffic microphones, and the like may report roadside sensor data that may be associated with a vehicle based on a correlation of geolocation, optical character recognition (OCR) of license plates, wireless beacons with identifiers transmitted by vehicles and received by the roadside sensors, or the like. In some embodiments, roadside sensors may detect a vehicle having a pre-existing vehicle profile. As further described below, based on known geolocation values, visual data, audio data, and other data measured by the roadside sensor, some embodiments may determine that a vehicle detected on a road is the same as the vehicle having the pre-existing vehicle profile. For example, some embodiments may detect a signal being transmitted from a wireless tire pressure gauge of a first vehicle at a traffic light and determine a license plate sequence of the first vehicle using OCR. As further described below, some embodiments may recognize this signal as belonging to the first vehicle based on the signal or recognize a matching license plate sequence. In response, some embodiments may update a corresponding vehicle profile to record the presence of the vehicle in the proximity of the roadside sensors.

In some embodiments, the process 300 includes sending vehicle-layer results or roadside sensor results to a local computing layer, as indicated by block 320. In some embodiments, sensor data or results based on sensor data may be communicated to the local data center using wireless methods, such as via a wireless base station. Alternatively, or in addition, data can be sent to local computing layers via a wired connection to a local computing data center. One or more processors accessible to the local computing layer may be used to provide computations for local layer machine-learning operations based on the received data, wherein the local layer machine-learning operations may use more resource-intensive machine-learning methods than those used for the vehicle computing layer.

One or more local computing data centers or other computing devices of a local computing layer may ingest any type of sensor data, results based on sensor data, or other data from a plurality of vehicles in the vehicle computing layer for machine-learning operations or other computations. In addition, the devices of the local computing layer may ingest any type of data from roadside sensors for machine-learning operations or other computations. For example, a data center of the local computing layer may receive a set of machine-learning outputs, perceptron weights, and geolocation data for a first vehicle from a first training operation performed at the vehicle computing layer and a set of machine-learning outputs, perceptron weights, and geolocation data for a second vehicle from a second training operation performed at the vehicle computing layer. In some embodiments, vehicle-layer results or other results may be sent to other layers directly, with or without sending results to a local computing layer. For example, as further described below, vehicle-layer results may be sent directly to an application executing on the top-view computing layer of a multilayer vehicle learning infrastructure without passing through the local computing layer.

Some embodiments may include determining a road network graph based on GPS data or geolocations reported by vehicle sensors, as indicated by block 322. Some embodiments may determine and use a road network graph using an application executing on the local computing layer, wherein the road network graph comprises a set of road nodes or a set of road segments. A data center of a local computing layer may acquire the road network graph by selecting the graph from a road network graph repository stored on an external source, such by accessing an API for Here Maps™. For example, by correlating the specific geolocations with locations listed in a road network graph repository within a range of 1.0 meters, some embodiments may generate a boundary region and then select all nodes and node links within the boundary region to form the road network graph.

Alternatively, or in addition, some embodiments may track the geolocations provided by the vehicles of the vehicle computing layer and connect these geolocations to form a road network. Some embodiments may combine externally provided data and vehicle-provided geolocations to generate one or more road network graph. Some embodiments may use portions of the road network graph to define sub-regions comprising a plurality of road network nodes or road network segments for further analysis of specific paths in the road network traversed by one or more vehicles. In some embodiments, the shapes, measured traffic amounts, lengths, or other values associated with the road network or portions of the road network may be used as inputs of the machine-learning operations described further below. In addition, while discussed above as being performed by an application executing on the local computing layer, either or both computing devices of the vehicle computing layer or top-view computing layer may be used to generate a road network graph.

Some embodiments may implement one or more machine-learning systems to classify regions in the road network graph. For example, some embodiments may train or use a decision learning tree, a classification tree, a classification neural net, or the like to classify segments of road in a road network during particular durations of time as low risk, medium risk, or high risk. Some embodiments may use other classifiers for road segments in a road network graph, such as being a school zone, as having a prevalence of drunk drivers, as presenting risk that is relatively highly correlated with certain types of weather events like rain, as being a interstate, a feeder road, and on-ramp, under construction, or a side street, or the like. In some embodiments, these classifications may be included in or otherwise linked to a road network graph. In some embodiments, a region as high risk may be selected or otherwise indicated as an additional deployment site for a new roadside device such as a traffic light, roadside sensor, security sensor, etc.

Some embodiments may include an operation to cluster classes of road segments in the road network graph for various attributes, such as inclement weather events, collision events, construction occurrences, car failures, and the like. Some embodiments may further search through the vehicles in the vehicle computing layer to determine a set of on-incident vehicles involved in of each of the clustered road segments. In some embodiments, clustering classes of road segments over large geographic regions for specific events and attributes may provide enhanced search and road-based indexing features to help reduce problems related to the data sparseness of low-probability events such as traffic collisions. In some embodiments, one or more neural networks described elsewhere in this application may be periodically re-trained based on one or more of the clusters of road segments and their corresponding on-incident vehicles. For example, the local layer machine-learning operation described for block 324 below may include instructions to perform an additional training operation when the set of on-incident vehicles increase for clusters comprising events such as fatal accident events, heavy rain events, wildlife collision events, or the like. Furthermore, some embodiments may generate a similarity score for a region based the road network graph of that region, wherein the similarity score may allow for comparison of city traffic flow in terms of metrics such as vehicle density, pedestrian density, safety, street geometry, collision events, and the like.

Some embodiments may include performing one or more local layer machine-learning operation executing on the local computing layer based on vehicle computing layer results or roadside sensor results to determine one or more local computing layer results, as indicated by block 324. In some embodiments, the local layer machine-learning operation may include using an agent executing on one or more processors of the local computing layer to perform a machine-learning training operation. Alternatively, or in addition, the local layer machine-learning operation may include using the agent to use a trained machine-learning system to determine an output. As further described below, these outputs can include though are not limited to a predicted operator or vehicle behavior, a labeled operator or vehicle activity, a risk value, a control-system adjustment value, or the like. Either or both machine-learning system state values or outputs may be considered local computing layer results and may be used for further operations or transmitted to other layers in the multilayer vehicle learning infrastructure.

Some local layer machine-learning operations may include training a neural network. In some embodiments, training the neural network can include training a convolutional RNN such as a convolutional long-short-term memory (LSTM) neural network. A LSTM may provide a means of classifying/labeling one or more portions of time-series data across a set of specified vehicles and use these classifications to determine a vehicle profile. For example, a convolutional LSTM may be used to analyze vehicle video data to determine and label vehicle movement patterns as expected or anomalous based on the vehicle driving environment. A convolutional LSTM neural network can include a first CNN layer comprising regularized multilayer perceptrons, a subsequent LSTM layer, and a dense layer at an output of the convolutional LSTM neural network. Each perceptron of a plurality of layers of a CNN can be connected to a set of perceptrons in their respective next layer in the CNN and have an associated CNN filter comprising a vector of weights and a bias value for each of the perceptrons, wherein a plurality of the perceptrons within a layer may share a CNN filter. Various regularization schemes can be applied when using the CNN, such as introducing a dropout operation, applying a dropConnect operation, stochastic pooling, using artificial data, or adding a weight decay term, or applying a max norm constraint by limiting a magnitude of the weight vector for every perceptron. As further described below, such regularization schemes can be implemented for another neural networks at any layer of a multilayer vehicle learning infrastructure.

In some embodiments, a LSTM neural network may include a set of cells, wherein each cell may comprise a set of perceptrons. Each LSTM cell may comprise a first perceptron acting as an input gate to receive a value for the cell, a second perceptron acting as a forget gate to determine how much of a value remains stored in the cell, and an output gate to determine an output value from the cell that is based on the value stored in the cell. The implementation of the LSTM neural network or features of the LSTM neural network such as a forget gate may help with interpretation of time series data.

Some embodiments may include elements of attention mechanisms when implementing one or more machine-learning methods executing on the local computing layer. Some embodiments may include attention mechanisms by using an agent executing program code to run a transformer model for machine-learning. A transformer model may include an encoder module, wherein the encoder module may include a first multi-head self-attention layer and a feed forward layer. The multi-head self-attention layer can apply a softmax function on one or more vectors to generate a set of attention weights, wherein the one or more vectors can be based on an input sequence, and wherein the set of attention weights are based on individual elements the input sequence such as an event log. The attention weights and the input sequence can then be used in a first feed forward layer of the encoder portion of the transformer. For example, the attention weights and an event log can then be used in a first feed forward layer to weight each event of the event log by their respective attention weight. The output of the feed forward layer can then be used by a decoder portion of the transformer, wherein the decoder portion may include one or more other multi-head self-attention layers having different weights and other values from the first multi-head self-attention layer. The decoder portion may also include one or more feed forward layers having different weights and other values from the first feed forward layer. The output of the decoder portion of transformer can be used to categorize an input or generate inferences. For example, if the input sequence is a time series based on the number of swerves during a drive, an agent executing a neural network having an attention mechanism may determine whether swerves are safe or risky in an interval based on current and past vehicle operations. In response to a determination that the number of risky swerves exceed a threshold number, and as further described below, the agent may induce the local computing layer to determine an adjustment value to change at least one of a LIDAR warning range, a steering wheel responsiveness, or an anti-lock braking system responsiveness.

Some embodiments may implement aspects of federated learning (FL) methods. During the implementation of a FL method, a federating application executing on the local computing layer or the top-view computing layer of the distributed hierarchical learning model may select a subset of vehicles in the vehicle computing layer for training. The federating application may transmit a global model to one or more computing devices in each of the selected vehicles for training. Each selected vehicle may use one or more agents to perform a training operation on the global model based on its respective sensor data, sensor data results, and other data before sending vehicle-specific results from the vehicle-specific training operation to the local computing layer or top-view computing layer, wherein each of the vehicle-specific results of each vehicle agent may be encrypted and uninterpretable to agents or other applications executing on the other vehicles.

For example, each selected vehicle may transmit its respective state values (e.g. gradients or perceptron weights) from a training operation to a data center of the local computing layer after encrypting the state values into cryptographic hash values. One or more applications on the local computing layer or on the top-view computing layer may then modify a global model based on the results from each of the selected vehicles and transmit the modified global model to each of the selected vehicles for further training. For example, a data center may receive a cryptographic hash of a weight $W_{a1}$ for perceptron A from vehicle 1 and a cryptographic hash of a weight $W_{a2}$ for perceptron A from vehicle 2 corresponding to the perceptron A of the global model pushed to both vehicle 1 and vehicle 2. In response, an agent executing on the data center may calculate a measure of central tendency $W_{a\text{-}avg}$ based on the cryptographic hashes of the weight $W_{a1}$ and the weight $W_{a2}$, either by first decrypting the encrypted values or by performing operations on the cryptographic hash values themselves. The measure of central tendency is a summary statistic of a dataset, and can be at least one of a mean average, median, mode, or the like. The application executing on the local computing layer or the top-view computing layer may update the global model such that the perceptron A in the updated global model has a weight value of $W_{a\text{-}avg}$ before further iteration of the federated learning process. The value $W_{a\text{-}avg}$ or an output based on the value $W_{a\text{-}avg}$ (e.g. the updated global model) can then be sent back to applications executing on the vehicle computing layer, wherein the applications may then perform their own respective decryption operations.

In some embodiments, the above operations of sending weights and performing operations based on the weights may be performed without encryption. In cases wherein weights are not encrypted, the calculated measurement(s) of central tendency or outputs based on the measurement(s) of central tendency can be sent back to applications on the vehicle computing layer and used by the applications on the vehicle computing layer without decryption. In addition, noise may have been injected during the process, which may reduce the accuracy of a training operation, but may increase the security and privacy of data provided to the FL training operation.

Some embodiments may also implement transfer learning methods between vehicle computing devices in the vehicle computing layer and also between devices of the vehicle computing layer and other layers of the multilayer vehicle learning architecture. During transfer learning, an agent may first train one or more machine-learning systems to perform a first prediction task and store the weights, biases, and other values of the one or more machine-learning systems for use when training for a subsequent prediction task. Some embodiments may also transfer weights, biases, and other values of a shared machine-learning model between different vehicles in vehicle computing layer, between different computing devices in a local computing layer, or between different top-view computing applications in a top-view application layer. For example, a first vehicle may directly transfer one or more perceptron weights of a neural network to a second vehicle.

Some embodiments may implement transfer learning using a federated framework, which can be labeled as a federated transfer learning (FTL) method. For example, a first vehicle computing device may train a learning model based on a first set of training data and transfer a first set of encrypted results including training gradients to a second vehicle computing device. The second vehicle computing device may have a second set of encrypted results determined from a training operation based on a second set of training data, wherein the first set of training data and second set of training data may or may not share mutually exclusive features. The second vehicle may then transfer both the first set of encrypted results and second set of encrypted results to a data center of the local computing layer. The data center of the local computing layer may update a global model based on training gradients and the shared features between the first vehicle and the second vehicle and send the updated global to the first and second vehicles.

Some embodiments may use multiple classifier systems such as an ensemble learning method, wherein the ensemble learning method may include combinations of different machine-learning methods. Some embodiments may apply elements of a one type of learning model to other types learning models. For example, some embodiments may include operations to implement a multi-head self-attention layer to outputs of a RNN neural network. Some embodiments may use both the attention weights and the results as inputs for additional layers during a machine-learning training operation or prediction operation.

Some embodiments may include training and using one or more of the learning methods described above to predict a future vehicle behavior based on known sensor data from a plurality of vehicles. For example, in some embodiments, a data center in a local computing layer may train and then use an ensemble system comprising a federated machine-learning system having an attention model and a CNN that uses vehicle geolocation data, vehicle velocity data, and LIDAR-detected object data from a plurality of vehicles to predict whether a vehicle having a particular vehicle profile will encounter an accident in a 1 month period. Either or both the internal state variables (e.g. biases and weights) from training and the outputs from use the trained ensemble system may be used as local computing layer results.

Some embodiments may include training a machine-learning system or using a trained version of one or more of the machine-learning systems described above. A machine-learning system can be used to predict or categorize a vehicle behavior or operator behavior based on known sensor data from a plurality of vehicles. For example, in some embodiments, a data center in a local computing layer may train and then use a convolutional RNN with an attention mechanism to review inward facing cameras to determine whether or not a vehicle operator was facing a front window with both hands on a steering wheel. Either or both the internal state variables (e.g. biases and weights) from training and the outputs from using a trained convolutional RNN may be part of the local computing layer results.

Some embodiments may include training and using one or more of the learning methods described above to determine a risk value associated with operating a vehicle or to determine an adjustment value to reduce vehicle operation risk. The learning methods may be based on sensor data and other data available to the local computing layer. Such data may include data stored in a vehicle profile, vehicle operator profile, corresponding road network graph data, and the like. In some embodiments, a risk value associated with places represented by one or more segments/nodes in a road network graph may represent the risk of a collision or other harmful incident and can be determined with a variety of techniques. Relevant attributes of a place may include an average vehicle speed within the place, an average of vehicle accelerations within the place, an average of vehicle impulse within the place, and an average frequency with which vehicles engage in brakes within the place, or distributions thereof for a population. For example, some embodiments may be trained to increase a risk value for a vehicle with respect to an average vehicle speed and increasing average vehicle accelerations when the vehicle is traveling along a road segment.

In addition, some machine-learning embodiments may be trained to assign or increase an amount of risk to a road segment with respect to a density of pedestrians, cyclists, or other large moving entities capable of being harmed or harming the vehicle. The density may be determined using vehicle proximity data provided by one or more vehicles in the vehicle computing layer, wherein an increase in density results in an increase in the risk. For example, some embodiments may increase the risk value by 1% for every additional large moving entity detected by a vehicle LIDAR sensor within a 100-meter long road segment. In some embodiments, a risk value for the vehicle may also increase based on the velocities or acceleration of moving entities around the vehicle. For example, a risk value to a vehicle may increase when the detected average speed of one or more cyclists increases along a road segment. Similar techniques may be applied to other vehicles, for example, like battery-powered electric scooters that users can rent with a native app. In some cases, providers of native applications for renting various types of transportation devices like bicycles, scooters, and the like. These providers may provide geolocation data indicative of the velocity, intensity of usage of their products, or other information about these transportation devices. Some embodiments may determine one or more risk values to roads or other places based upon this data.

Some embodiments may calculate one or more control-system adjustment values directly based on the known values with respect to one or more vehicles, one or more vehicle operator, and one or more places through which the one or more vehicles are traveling. By applying one or more of the above-mentioned machine-learning operations, some embodiments may determine one or more parameters to reduce a risk value associated with driving a vehicle through a particular place as represented by a road network graph. For example, some embodiments may use an objective function to train a machine-learning system. The objective function may be based on the above-mentioned road risk elements determined based on one or more vehicle geolocations, the control-system data and vehicle proximity data in a feature-reduced form, and vehicle adjustment parameters that may be varied within a parameter space. In some embodiments, the objective function may be altered such that the determined risk value is independent of at least one of the road risk elements, control-system data, or vehicle proximity data. Some embodiments may incorporate various information stored in the vehicle profile or corresponding operator profile during training and subsequent use of a neural network to determine a control-system adjustment value. For example, some embodiments may train and then use a machine-learning system to determine an accelerator response rate as an output (i.e. rate of vehicle acceleration turning in response to an operator pressing an the accelerator pedal or button on vehicle) based on an input of a number of detected other moving objects around the vehicle, the force at which the vehicle operator presses on an accelerator pedal, and the number of recorded accidents near the vehicle's geolocation.

In some embodiments, a result may include a visual record of an accident and a geolocation of the reported sighting. In some embodiments, an application operating on the local computing layer may apply a trained CNN to analyze the visual record and categorize this record as corresponding to an accident. The application can then analyze the activity and statuses of a plurality of rescue vehicles in a fleet and select an optimal rescue vehicle. The application can then transmit instructions to the selected rescue vehicle to proceed to the geolocation of the accident. In some embodiments, the analysis and selection of the plurality of rescue vehicles may be performed using one or more of the machine-learning operations described above.

Some embodiments may include determining one or more control-system adjustment values based on the local computing results, as indicated by block 328. As stated above, some embodiments may directly use one or more machine-learning methods to determine one or more control-system adjustment values in a parameter space. Alternatively, the adjustment value can be determined based on a comparison of a computed risk value with one or more pre-determined or calculated risk thresholds. For example, using one or more of the trained machine-learning operations described above for block 324, an application executing on the local computing layer may determine that a risk value for collision is 0.52%. After comparing this risk value to a pre-determined risk threshold of 0.5%, an adjustment value can be determined to modify one or more vehicle operational parameters until the new risk value is less than or equal to the pre-determined risk threshold. For example, some embodiments may lower a risk value by setting an adjustment value to represent a LIDAR warning range, wherein new adjustment value increases the LIDAR warning range by 0.5 meters. As another example, some embodiments may set the adjustment value to represent a vehicle acceleration, wherein the new adjustment value reduces the vehicle acceleration value while an adaptive cruise control system is activated. In some embodiments, the one or more control-system adjustment values may be pushed or pulled to a corresponding vehicle during a wireless data session. Alternatively, transmission of the one or more control-system adjustment values to a vehicle may be modified, delayed, or stopped by further operations executing on a top-view computing layer, as further described below.

Some embodiments may include transmitting one or more local computing results to a top-view computing layer, as indicated by block 332. In some embodiments, the local computing results or other data may be communicated to the top-view computing layer using wireless methods, such as via a wireless base station. Alternatively, or in addition, data can be sent to local computing layers via a wired connection to a local computing data center. In some embodiments, transmitting data to a top-view computing layer can include transmitting the data to one or more cloud-based applications executing on a cloud computing platform such as Amazon Web Services™, Google Cloud™, Microsoft Azure™, and the like. Alternatively, transmitting data to a top-view computing layer can include transmitting the data to a top-view application executing on a dedicated physical server. In some embodiments, the top-view computing layer may have access to greater memory, a greater number of processors, greater processor speeds, or other increased computational resources in comparison to any single computing device of the local computing layer.

In some embodiments, such as with the use of a distributed application, some embodiments may transmit the one or more local computing results to the distributed application instead of a top-view application for further computations. The distributed application may act as part of the top-view computing layer. In some embodiments, the distributed application may be executing on the same set of data centers or other computing devices that are part of the local computing layer. Alternatively, the distributed application may be executing a different set of data centers or other computing devices.

In some embodiments, a profile graph may be formed based on the profiles created above and other online profiles, as indicated by block 336. Each node of a profile graph may correspond to a different profile corresponding to a user, wherein a user may be a vehicle operator, a vehicle passenger, or some other person associated with a vehicle having a vehicle profile. Edges of a profile graph may indicate confidence or probability of pairing between the profiles. In some embodiments, nodes may correspond to vehicle profiles, operator profiles, various online profiles accessed by the user while the user in a related vehicle, and computing devices associated with the user. In some cases, these online profiles may be associated (e.g. by edges of the graph) with user accounts that the users may access across multiple different computing devices. Some embodiments may store the resulting profile graph in memory, in some cases updating an index in one or more data repositories by which the various profiles are linked to expedite searching.

A variety of techniques may be implemented to form a profile graph for each user in a population. In some embodiments, profiles may be linked by shared profile attributes, such email addresses or usernames, thereby yielding edges in the profile graph of relatively high confidence or probability. In some embodiments, profiles may be linked based on identifiers of computing devices by which those profiles are accessed, for instance, different profiles accessed with the same device having the same UDID or ADID or a tracking cookie, thereby also forming edges of relatively high confidence or probability.

In some cases, matching may be expedited for large-scale data sets by segmenting the data and matching within segments. For instance, some embodiments may segment data according to coarse geographic regions, like larger than 100 square kilometers, and then match data in each region only to data in that region (and in some cases adjacent regions) to reduce combinatorial scaling challenges. Some embodiments may hash various attributes, like coarse measures of time and place, to produce a low-cardinality hash value, like a two-digit or three-digit hash digest of the records, and match data having the same hash value.

Some embodiments may implement specific techniques to match online profiles with vehicle profiles or other vehicle data to form edges in profile graph. For example, some embodiments may obtain geolocations such as timestamped geolocations in a location history associated with computing devices, vehicle data associated with online profiles, or both. Some embodiments may cluster these records in space and time, for instance, with a density-based clustering algorithm, like DBSCAN. Some embodiments may link online profiles, mobile devices, or collections of vehicle data within the same cluster as geolocations of automotive data as being associated with that vehicle, for instance, in some cases responsive to also determining that there is more than a threshold amount of time stamped geolocations, more than a threshold frequency, or more than a threshold duration of data in the cluster for each node being linked. In some embodiments, added edges may have a weight associated therewith indicative of confidence in the match, for instance, based upon a number of data points in the cluster, a frequency of data points, a duration of data points, a volume enveloped by a convex hull of the cluster, a density of points in that convex hull, or the like.

In some embodiments, edges may be formed indirectly. For example, some embodiments may associate a vehicle with the mobile device and associate that mobile device with an online account, thereby associating the vehicle with them mobile online account. In some embodiments, the profile graph may also include nodes corresponding to these computing devices. In some embodiments, additional signals may be used to pair user profiles with vehicle data. For example, some embodiments may access an inventory of which devices are paired with one another in a native application executing on a mobile phone or a computing device attached to a vehicle, and some embodiments may determine that the two are to be linked based upon such records.

Some embodiments may compare a plurality of publicly provided online profiles with vehicle profiles or operator profiles to determine possible matches in information. For example, some embodiments may view publicly provided online images to determine a possibility of vehicle ownership and a prediction about the make and model of the vehicle using a trained convolutional neural network. A trained neural network may determine probabilities for how much a provided online profile matches with a vehicle profile or an operator record. In some embodiments, these probabilities may be used to compensate for vehicle profiles or operator profiles missing certain desired identifier information in order to generate pseudo-identities for a vehicle profile or operator profile. For example, some embodiments may include a vehicle profile that does not include a home address or an identifier of a vehicle operator in a namespace other than that of the vehicle's data provider.

By using graph profiles or match probabilities associating provided online profiles with operator records or vehicle records, additional information may be used for the purposes of population segmentation and study. For example, data from a publicly provided social media profile can include a geographic location, age range, and interests and can be used as an input for a trained neural network to predict a vehicle make and model. Some embodiments may associate the social media profile with a vehicle profile having the predicted vehicle make and model. This association may be useful for further studies and provide information such as whether or not a vehicle will be carrying the person with the social media profile at a probability greater than a threshold probability, such as greater than 20%, greater than 50%, or greater than 80%.

Some embodiments may select advertisements for display based on the operator profile or vehicle profile. Other embodiments may bid on advertising auctions based on operator profile or vehicle profile. Other embodiments may recommend content or products based on these profiles, route vehicles through particular paths based on these profiles, direct public works projects based on these profiles, and the like.

Some embodiments may include performing a top-view layer machine-learning operation executing on a top-view computing layer based on data from at least one of a local computing layer results or vehicle computing layer, as indicated by block 340. In some embodiments, performing the top-view layer machine-learning operation may include using an agent executing on the top-view computing layer to perform one or more of the machine-learning methods or other tasks described above. For example, an agent being executed by the one or more processors of the top-view computing layer may generate a road network graph or train a convolutional RNN having an attention mechanism to analyze sensor data stored in an event log to predict the risk value for an accident.

In some embodiments, a top-view computing application being executed on the top-view computing layer may act as an overriding agent that can modify, stop, or expand on operations to train or use machine-learning systems in any of the layers of the multilayer vehicle learning infrastructure. In some embodiments, the top-view computing application may perform one or more recurring activities to enforce a cyclical learning hierarchy by initiating one or more learning tasks to continually pull additional training data from the vehicle computing layer or the local computing layer. In addition, the top-view computing application may modify learning behavior in other machine-learning operations by applying policy gradient reinforcement learning methods, as further described below. Furthermore, the top-view computing application may include program code to start a re-training operation, induce a switch to a different machine-learning system, or rely on non-learning automation systems when a data stream, component, or layer becomes inaccessible to other components in the multilayer vehicle learning infrastructure. While the above embodiment discloses the top-view computing application controlling other layers, some embodiments may restrict the top-view computing application from directly controlling applications executing on other layers.

Some embodiments may include elements of reinforcement learning having one or more policy gradient methods. An agent executing on a top-view computing layer may proceed through a Markov decision process, wherein the sensor data from one or more vehicles, other data such as weather, and computed results may be discretized and treated as a finite set of states. In some embodiments, the control-system adjustment values or parameters used during machine-learning operations may be treated by the agent as the available actions in each state. A history of the control-system adjustments and their resulting effects may be evaluated using a reward system when implementing the reinforcement learning method. For example, positive feedback from a vehicle operator resulting from a query or a decrease in accident rates may be used by a reward function to provide reinforcement for an adjustment value change. Similarly, negative feedback from a vehicle operator or an increase in accident rates may be used by the reward function to discourage use of the adjustment value change. In some embodiments, the reinforcements may be provided through simulations of vehicle behavior based on one or more road network graphs or through a third-party system instead of or in addition to physical changes.

In some embodiments, an agent executing a reinforcement learning operation may modify an ensemble learning method to balance weights used in or applied to different machine-learning operations, wherein the reinforcement function may reward vehicle performance improvements, vehicle safety parameters, or a computation speed to different combinations of machine-learning approaches. For example, the agent may use a reinforcement learning approach to determine which of a combination of neural network features are to be implemented at the vehicle computing layer and the local computing layer based on a reward function. In some embodiments, the reward function used may be based on an accuracy parameter and a response time parameter. Use of this reward function during a reinforcement learning operation may result in a selection of a CNN computation on the vehicle layer and a selection of a convolutional LSTM having an attention mechanism on the local computing layer. By performing this meta-analysis and similar meta-analysis of machine-learning systems in a multilayer vehicle learning infrastructure, the agent executing on the central computing layer may be used to further refine and optimize machine-learning operations.

Some embodiments may supplement the reinforcement learning operation with a policy gradient method. An agent executing the reinforcement learning operation may implement a policy to determine a trajectory for a control-system adjustment values and other changes to vehicle behavior, wherein the proposed changes follow a policy gradient between any timestep. In some embodiments, the policy gradient of the policy may be changed based on the REINFORCE method. For example, while executing a reinforcement learning operation, an agent may implement a policy gradient determination operation, wherein one or more observables or quantifiable values such as response time, number of swerves, number of collisions, vehicle sensor data values, or the like may be used to determine a general path likelihood ratio as a gradient estimate.

In some embodiments, one or more applications operating on the central computing layer can re-perform or expand operations described above for any or all of the vehicles or local computing data centers in the vehicle computing layer or local computing layer. For example, some embodiments may combine a plurality of smaller road network graphs to generate a larger road network graph. The increased amount of data available to a machine-learning method executing on the top-view computing layer relative to a machine-learning method executing on the local computing layer may result in an increase in the predictive accuracy of the machine-learning method and detection of region-level anomalies that may be more difficult to detect or characterize using data available to only one computing device of a local computing layer. In addition, an increased amount of computing resources may reduce the time required to perform various resource intensive computation activities, such as video analysis or tasks that may benefit from parallel computing. The application and re-application of neural network operations across a plurality of parameters allows deeper understanding of the latent space of various previously disparate records or data, such as vehicle sensor data, operator profile data, road network graph data, and online profile data.

In some embodiments, the top-view computing layer may store vehicle data, operator data, or other data in a centralized history repository. Some embodiments may periodically, or in response to various events, interrogate and analyze this history repository to construct one or more localized models. Some embodiments may construct a localized model of one or more roads, road segments, polygons corresponding to a place of interest, or the like. For example, some embodiments may construct a region separated into a set of tiles such as a square tile having one kilometer (km) long sides, a hexagonal tile, tiles of other shapes.

Some embodiments may overlay particular data models with tiles being associated an index with polygons, bitmaps, or vector graphic definitions of geographic features within those tiles. Some embodiments may implement this operation to increase the speed of computational operations based on the data model. For example, some embodiments may search for features in a tiled region in which a selected geolocation resides. By quickly limiting the search to a subset of the available tiles in the data model instead of searching through the entire map corresponding to the data model, a significant amount of time or computational resources may be saved. In some embodiments, the edges of those tiles may be aligned with multiples of 10 in latitude and longitude coordinates, such that corresponding tiles for a given coordinate may be identified by truncating less significant digits of a geolocation to be analyzed within the tile. In some embodiments, tiles may have identifiers or may be reference in an index by these less significant digits.

In some embodiments, road network nodes, road network segments, or tiles may serve as atomic units of geography and may have various attributes inferred from the information in the centralized history repository. For example, a given segment of road may be associated with a distribution of traffic density, a distribution of speed density, or other geolocation-related information. In some embodiments, these atomic units of geography may have attributes that are segmented by time. A road segment may have different values for an attribute corresponding to different times of day, days of the week, days of the month, days the year, or combinations thereof. For example, a particular intersection may be represented by a road network node and may have an accident frequency of 10% on Sundays between 7 and 10 AM and an accident frequency of 25% during weekdays between 5 and 6 PM. In some embodiments, these attributes may be inferred directly from the centralized history repository. In some embodiments, these attributes may be inferred indirectly, for instance, attributing attributes of people to the vehicles in which they ride, attributing attributes of places to people visiting those places, attributing attributes of places to vehicles visiting those places, or the like.

In addition, data available from online profiles and other data referenced in a corresponding profile graph may also be used by a machine-learning operation or other learning operations to determine vehicle adjustment values or provide other results. These learning operations can include training a machine-learning system or using a trained machine-learning system to find trends, determine inferences, and determine other relationships between a user attributes and vehicle behavior based on data available from a profile graph. For example, a graph profile may be used to determine attributes such as a prevalence of users inclined towards football, SUV vehicles, sports cars, luxury cars, a prevalence of users in a particular demographic or psychographic segment, a frequency of accidents, flat tires, pot holes, school zones, a frequency of acceleration or deceleration above some threshold, or the like.

In some embodiments, these attributes may be inferred with machine-learning techniques. These machine-learning techniques can include one or more of those listed above, such as a RNN using stochastic gradient descent when minimizing an objective function. Other machine-learning methods may include classification and regression tree (CART), a Bayesian optimization, a simulated annealing, or other optimization techniques by which attributes of users and places may learned from historical data. In some embodiments, attributes may be inferred with statistical techniques. For example, some embodiments may classify distributions of data and designating as attributes descriptive statistics of those distributions, like mean, median, mode, standard deviation, variance, and the like. In some embodiments, attributes may be classifications learn from features and a plurality of different channels of information in the history repository.

Some embodiments may perform a top-view layer machine-learning operation by training one or more of the machine-learning systems described above or by using a trained version of one or more of the machine-learning systems described above. For example, an agent executing on the top-view computing layer may perform a training operation by training a machine-learning system using a first set of local computing layer results from a first data center, a second set of local computing layer results from a second data center and a set of geolocations as inputs. In this example, the first set of local computing layer may be based on data from a first vehicle and a second vehicle, the second set of local computing layer results may be based on data from a third vehicle, and the set of geolocations may include the geolocations corresponding to each of the first vehicle, second vehicle, and third vehicle. A top-view computing neural network may then be trained to determine a top-view control-system adjustment value based on at least one of the local computing layer results, vehicle computing layer results, sensor data from a plurality of vehicles, operator profiles, and roadside sensor data.

In some embodiments, an application executing on the top-view computing layer may apply one or more control-system adjustment values based on sensor data from a first and second vehicle to modify the operations of a third vehicle, wherein applying the control-system adjustment value may be done through an actual adjustment of vehicle operations or through a simulation. In response, the top-view computing layer may determine whether applying the one or more control-system adjustment values to the third vehicle would reduce a risk value below a risk threshold value, or whether the proposed control-system adjustment value violates any other adjustment value limitations programmed into one or more media of the top-view computing layer.

As discussed above, various specific machine-learning systems may be trained and used on when executing on the top-view computing layer. In some cases, high-resource learning operations may be pushed to the top-view computing layer for execution. For example, tasks such as analyzing video streams, high volume data, or high noise applications may transfer from the vehicle computing layer or the local computing layer to the top-view computing layer.

Some embodiments may determine whether one or more of the computed results satisfy one or more adjustment transmission criteria, as indicated by block 344. In some embodiments, the determination that the adjustment transmission criteria are satisfied may be whether or not any non-zero control-system adjustment values were determined based on operations such as those described for block 328 or bock 340. Alternatively, or in addition, some embodiments may include a minimum or maximum adjustment threshold. For example, if a control-system adjustment to an ABS stopping rate is set to be a 30% increase but the maximum limit on a single control-system adjustment value is 10%, the control-system adjustment value may be cancelled or otherwise limited to the maximum adjustment value. In some embodiments, if the control-system adjustment does not match or exceed a minimum adjustment threshold, some embodiments may determine that the adjustment transmission criteria are not satisfied. In addition, in the case that all risk threshold values are already met as discussed above for block 328, some embodiments may determine that the adjustment transmission criteria are not satisfied. Conversely, some embodiments may determine that the adjustment transmission criteria are satisfied if a computed risk value exceeds at least one or more risk threshold values. Upon determining that no adjustment transmission criteria are satisfied, some embodiments may return to block 302 and continue obtaining sensor data.

Alternatively, upon determining that the adjustment transmission criteria are satisfied, some embodiments may update and transmit control-system adjustment values to one or more vehicles based on the top-view computing layer results, as indicated in block 348. In some embodiments, such as if no applicable adjustment values are made in the local computing layer, the top-view computing layer may provide new adjustment values. For example, the top-view computing layer may generate and transmit a control-system adjustment value corresponding to a decrease of an acceleration rate for all vehicles in a region during the intervals of 11 PM to 4 AM, wherein no individual data center generated any adjustment values corresponding to an acceleration rate.

Some embodiments may update the control-system adjustment calculated for block 328 with the top-view control-system adjustment value described for block 340. In addition, some embodiments may completely replace control-system adjustment values calculated at the local computing layer with their corresponding top-view control-system adjustment values. In addition, the control-system adjustment value may be different across different vehicles in some embodiments. In some embodiments, a top-view application may standardize the control-system adjustment values across the different vehicles based on the top-view control-system adjustment value, such that all control-system adjustment values are set to be within a range of the top-view control-system adjustment value.

Some embodiments may determine that a difference between a particular control-system adjustment value and the top-view control-system adjustment value is greater than a difference threshold and mark the vehicle corresponding to that particular control-system adjustment value as abnormal. The marked vehicle may be investigated, or a corresponding vehicle owner may be notified of a possible vehicle issue corresponding to a vehicle failure, a sensor failure or operator misuse. For example, after a data center serving a first region in the local computing layer determines that an ABS responsiveness of a particular vehicle should be increased by 10%, the top-view computing layer may update the antilock braking responsiveness to 8% based on additional computations that take into account other regions traveled by the particular vehicle, wherein a minimum and maximum ABS adjustment value is between −6% and 8%, respectively.

In some embodiments, learned geographic features or attributes thereof may be sent to vehicles in the vehicle computing layer. These values may be pushed or pulled based upon various parameters such as a current geolocation of the vehicle, geolocation of a place set as a destination in a vehicle navigation system, a projected geolocation determined from a current vehicle direction and velocity. In some embodiments, a top-view computing layer may examine the geographic features are attributes thereof within a threshold distance or currently occupied tile may be sent to vehicles, and those records may be interrogated by the onboard computer of the vehicle to determine whether a task is to be performed. For example, an onboard computer may populate a heads-up display, inform navigation decisions of a self-driving car, facilitate real-time alerting to the driver of dangerous conditions, predictively adjust gear ratios, predictively adjust suspension systems, modulate headlight state or brightness, or perform other activities based on the interrogation results.

While a risk value may be used to determine a vehicle adjustment value, other uses for the risk value exist. Some embodiments may use a computed risk value to determine the probability that a demographic group will drive a particular vehicle or type of vehicle. For example, some embodiments may associate a vehicle with a person for various risk calculations such as insurance, credit, employment, etc. Some embodiments may associate the person with the vehicle using the profile graph or matching method discussed above for block 336. Alternatively, some embodiments may establish direct link between the person and the vehicle based on a direct statement by the person. Some embodiments may assess an insurance risk for a vehicle operator, a vehicle, or a place based on a linked vehicle. In some embodiments, insurance risk for a vehicle operator or vehicle can be based on a portion of a road network graph to generate a hyperlocal risk score, wherein specific attributes of a road network may be used to calculate the risk score for a road segment, a trip along a road network, or series of trips along a road network.

Figure 4:
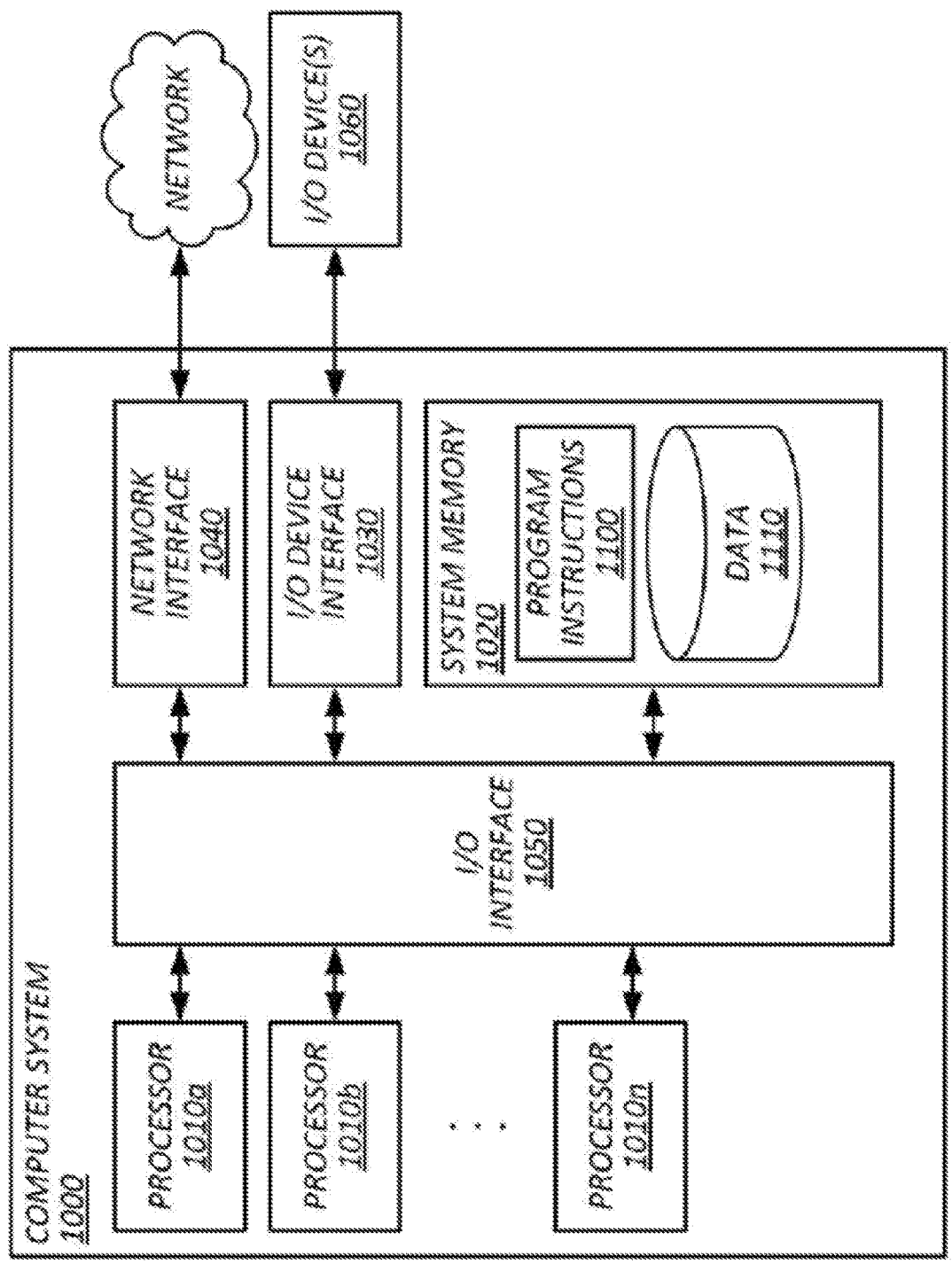
FIG. 4 shows an example of a computing device by which the present techniques may be implemented in accordance with some embodiments.

FIG. 4 shows an exemplary computing system 1000 by which the present techniques may be implemented in accordance with some embodiments. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010*a*-1010*n*) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010*a*), or a multi-processor system including any number of suitable processors (e.g., 1010*a*-1010*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., a vision processing unit (VPU), a neuromorphic complementary metal-oxide-semiconductor (CMOS) chip, an FPGA (field programmable gate array), a PGA (programmable gate array), or an ASIC (application specific integrated circuit) such as a tensor processing unit (TPU). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010*a*-1010*n*) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010*a*-1010*n*) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010*a*-1010*n*, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010*a*-1010*n*). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, sent via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information sent over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A non-transitory, machine-readable medium storing instructions that, when executed by one or more processors, effectuate operations comprising: obtaining a first set of geolocations, a first set of control-system data, and a first set of vehicle proximity data using a first set of sensors, wherein: the first set of sensors is attached to a first vehicle, the first vehicle includes one or more of a first set of processors executing a first vehicle application operating as a part of a vehicle computing layer, wherein the vehicle computing layer comprises a set of vehicle applications operating on the first set of processors, wherein each of the first set of processors are attached to one or more vehicles, the first set of geolocations, the first set of control-system data, the a first set of vehicle proximity data are concurrently obtained, the first set of control-system data comprises data indicating a use of a control system of the first vehicle, and the first set of vehicle proximity data comprises data corresponding to a distance to an object from the first vehicle; inferring, using the one or more processors attached to the first vehicle, a first set of vehicle computing layer results based on the first set of control-system data and the first set of vehicle proximity data using a neural network executing on the vehicle computing layer; sending the first set of vehicle computing layer results and the first set of geolocations to a local application executing on a local computing layer, wherein: the local application comprises a neural network executing on the local computing layer, the local application is configured to receive a second set of vehicle computing layer results and second set of geolocations from a second vehicle, the local computing layer comprises a set of local applications, wherein each of the set of local applications is configured to receives vehicle computing layer results, and each of the set of local applications is executing on one of a set of computing devices; training the neural network executing on the local computing layer to determine a first set of local computing layer results based on the first set of control-system data, the first set of geolocations, and a second set of control-system data from a second vehicle, wherein: the first set of local computing layer results comprises a control-system adjustment value, wherein the control-system adjustment value is at least one of a parameter used by the control system to determine a vehicle response of the first vehicle to an operator-effected change on the control system or a change in the parameter, and sending the first set of local computing layer results to a top-view application executing on a top-view computing layer, wherein: the top-view computing layer is configured to receive local computing layer results from the set of local applications, the top-view computing application comprises a neural network executing on the top-view computing layer, and wherein the top-view computing application also receives a second set of local computing layer results and third set of geolocations from a third vehicle; training a top-view computing neural network based on the first set of local computing layer results to determine a top-view control-system adjustment value based on a region containing the first set of geolocations, the second set of geolocations, and the third set of geolocations, wherein the top-view control-system adjustment value is different from the control-system adjustment value; updating the control-system adjustment value based on the top-view control-system adjustment value; transmitting the control-system adjustment value to the first vehicle; and adjusting a vehicle response to an operator-effected change in the first vehicle based on the control-system adjustment value.

2. The medium of embodiment 1, wherein: sending the first set of vehicle computing layer results comprises sending a masked first set of vehicle computing layer results, wherein the masked first set of vehicle computing layer results is determined by injecting a noise into an initial first set of vehicle computing layer based on a first amount of noise; the control-system adjustment value comprises an adjustment to the responsiveness of a vehicle braking system or the responsiveness of a vehicle acceleration system; and the operations further comprise: obtaining a second set of geolocations, a second set of control-system data and a second set of vehicle proximity data from the second vehicle; and determining, using the one or more processors attached to the second vehicle, a second set of vehicle computing layer results based on the second set of control-system data and the second set of vehicle proximity data using a second neural network executing on the vehicle computing layer, wherein the determination of the second set of vehicle computing layer results comprises changing the second set of vehicle computing layer results from an initial second set of vehicle computing layer results to a masked second set of vehicle computing layer results using a noise injection method based on a second amount of noise.

3. The medium of any one of embodiments 1-2, the operations further comprising: obtaining, using one or more roadside sensors, a visual recording of a feature; detecting and labeling the feature with the local application based on the visual recording of the feature; and determining that the feature and an object are physically connected based on a geolocation of the first vehicle and a comparison between a properties assigned to the feature and properties assigned to the object.

4. The medium of any one of embodiments 1-2, the operations further comprising: obtaining, using the first set of sensors, a first visual record of an additional vehicle; performing a machine-learning prediction operation to record a first set of features of the additional vehicle based on the visual record, wherein the first set of features comprises an identifier value that is visible in the visual record; mapping the first set of features to a first vehicle profile for the additional vehicle; obtaining a second visual recording of the additional vehicle, wherein the second visual recording is captured using one or more sensors other than those in the first set of sensors; performing a machine-learning prediction operation to record a second set of features of based on the second visual record, wherein the second set of features comprises the identifier value; creating a second vehicle profile for the additional vehicle based on the second visual record, wherein the second vehicle profile comprises an identifier value that is visible in the visual record; mapping the second set of features to a second vehicle profile for the additional vehicle; and based on a comparison between values stored in the first vehicle profile and the second vehicle profile, determining that both vehicle profiles correspond to the additional vehicle.

5. The medium of embodiment 4, the operations further comprising: determining that at least one of the third vehicle profile or the fourth vehicle profile includes an indicator that the third vehicle satisfies a vehicle risk warning threshold, and transmitting a message indicating to the first vehicle identifying the third vehicle in response to the determination that the third vehicle satisfies a vehicle risk warning threshold.

6. The medium of any one of embodiments 1-5, wherein: a neural network executing on at least one of the local computing layer or the top-view computing layer comprises a set of attention weights corresponding to an event log and weighting each event of the event log by their respective attention weight.

7. The medium of any one of embodiments 1-6, wherein: the control system comprises a vehicle braking system; the control-system data comprises a measure of a force at which the vehicle operator presses on an accelerator pedal; the vehicle proximity data comprises a number of detected other moving objects around the vehicle; training the neural network executing on the local computing layer comprises inferring an accelerator response rate as the control-system adjustment value based on using the measure of the force, the number of detected other moving objects, and a number of recorded accidents near the vehicle's geolocation as inputs; and adjusting the vehicle response comprises changing the accelerator response rate, wherein an increase in the accelerator response rate increases the vehicle acceleration with respect to a push in the vehicle accelerator pedal.

8. The medium of any one of embodiments 1-7, the operation further comprising selecting a road network graph from a road network graph repository based on the first set of geolocations, wherein: the road network graph comprises a plurality of nodes and links between the plurality of nodes, wherein each of the plurality of nodes correspond with a history of geolocations visited by the first vehicle, each respective link of the links between the plurality of nodes comprises a road segment, and the respective link is associated with one or more values that are dependent on a time of day, wherein the one or more values are based on a density measurement corresponding with the respective link.

9. The medium of any one of embodiments 1-8, wherein: determining the first set of vehicle computing layer results comprises using the control-system data as an input for an autoencoder neural network comprising an input layer and an output layer, wherein a total node count of the input layer is equal to a total node count of the output layer; and the operations further comprise training the autoencoder neural network, wherein training the autoencoder neural network comprises reducing a number of features in the first set of vehicle computing layer results, and wherein the first set of vehicle computing layer results comprises fewer features than a sum of the number of features in first set of control-system data and the number of features in the vehicle proximity data.

10. The medium of any one of embodiments 1-9, the operations further comprising: encrypting the first set of vehicle computing layer results into a first set of cryptographic hash values; encrypting the second set of vehicle computing layer results into a second set of cryptographic hash values; wherein the first set of vehicle computing layer results is received by the local computing layer as the first set of cryptographic hash values and the second set of vehicle computing layer results are received by the local computing layer as the second set of cryptographic hash values; and determining a set of central tendency measurements based on the first encrypted set of values and the second encrypted set of values; and transmitting the set of central tendency measurements to the first vehicle and the second vehicle.

11. The medium of any one of embodiments 1-10, the operations further comprising transmitting a weight of a first vehicle neural network from the first vehicle to the second vehicle, wherein the first vehicle neural network is configured to be executed on the one or more processors attached to the first vehicle.

12. The medium of any one of embodiments 1-11, the operations further comprising: determine a baseline threshold region for the first vehicle based on data from the first set of sensors, where the baseline threshold region comprises at least one range of values, and wherein a determination that a set of data that satisfies the baseline threshold region indicates that a status represented by the set of data is normal; determine whether a baseline threshold region has been satisfied by the set of data; determine a defective sensor in the first set of sensors responsible for the abnormal signal; and display a message in the first vehicle indicating the defective sensor.

13. The medium of any one of embodiments 1-12, the operations further comprising transmitting one or more application state values from a first data center in the local computing layer to a second data center in the local computing layer, wherein the one or more application state values are usable by a second neural network configured to be executable by the second data center.

14. The medium of any one of embodiments 1-13, the operations further comprising: displaying a query in the first vehicle in response to a detected event to confirm that the detected event occurred; obtaining a response to the query; and transmitting the response from the first vehicle to the local application.

15. The medium of any one of embodiments 1-14, wherein: training the neural network comprises training the neural network to determine the control-system adjustment value based on an operator profile and a vehicle profile as inputs; and the operations further comprise: determining the vehicle profile based on the sensor data, wherein the vehicle profile comprises a history of events for the first vehicle; and determining the operator profile corresponding to a vehicle operator of the first vehicle, wherein the operator profile includes a plurality of records corresponding to events during which the vehicle operator was operating the first vehicle.

16. The medium of any one of embodiments 1-15, further comprising: selecting a road network graph from a road network graph repository based on the first set of geolocations; training a neural network to label a region the road network graph as a high risk region; and indicate that the high risk region is a possible site for deployment of a roadside device.

17. The medium of any one of embodiments 1-16, the operations further comprising: determining that a first sensor in the first vehicle is defective based on a comparison between an output of the first sensor and a detected event; wherein training the edge computing neural network comprises training the edge computing neural network without using any feature associated with the first sensor as an input; and wherein training the top-view computing neural network comprises training the top-view computing neural network without using any feature associated with the first sensor as an input.

18. The medium of any one of embodiments 1-17, wherein the neural network comprises a first set of perceptrons in a neural network layer, wherein each of the first set of perceptrons are connected with a subset of perceptrons in a second neural network layer.

19. The medium of any one of embodiments 1-18, wherein the neural network comprises a directed cyclic graph of perceptrons, wherein a plurality of the perceptrons comprises a time-varying activation value.

20. A method comprising: obtaining a first set of geolocations, a first set of control-system data, and a first set of vehicle proximity data using a first set of sensors, wherein: the first set of sensors is attached to a first vehicle, the first vehicle includes one or more of a first set of processors executing a first vehicle application operating as a part of a vehicle computing layer, wherein the vehicle computing layer comprises a set of vehicle applications operating on the first set of processors, wherein each of the first set of processors are attached to one or more vehicles, the first set of geolocations, the first set of control-system data, the a first set of vehicle proximity data are concurrently obtained, the first set of control-system data comprises data indicating a use of a control system of the first vehicle, and the first set of vehicle proximity data comprises data corresponding to a distance to an object from the first vehicle; inferring, using the one or more processors attached to the first vehicle, a first set of vehicle computing layer results based on the first set of control-system data and the first set of vehicle proximity data using a neural network executing on the vehicle computing layer; sending the first set of vehicle computing layer results and the first set of geolocations to a local application executing on a local computing layer, wherein: the local application comprises a neural network executing on the local computing layer, the local application is configured to receive a second set of vehicle computing layer results and second set of geolocations from a second vehicle, the local computing layer comprises a set of local applications, wherein each of the set of local applications is configured to receives vehicle computing layer results, and each of the set of local applications is executing on one of a set of computing devices; training the neural network executing on the local computing layer to determine a first set of local computing layer results based on the first set of control-system data, the first set of geolocations, and a second set of control-system data from a second vehicle, wherein: the first set of local computing layer results comprises a control-system adjustment value, wherein the control-system adjustment value is at least one of a parameter used by the control system to determine a vehicle response of the first vehicle to an operator-effected change on the control system or a change in the parameter, and sending the first set of local computing layer results to a top-view application executing on a top-view computing layer, wherein: the top-view computing layer is configured to receive local computing layer results from the set of local applications, the top-view computing application comprises a neural network executing on the top-view computing layer, and wherein the top-view computing application also receives a second set of local computing layer results and third set of geolocations from a third vehicle; training a top-view computing neural network based on the first set of local computing layer results to determine a top-view control-system adjustment value based on a region containing the first set of geolocations, the second set of geolocations, and the third set of geolocations, wherein the top-view control-system adjustment value is different from the control-system adjustment value; updating the control-system adjustment value based on the top-view control-system adjustment value; transmitting the control-system adjustment value to the first vehicle; and adjusting a vehicle response to an operator-effected change in the first vehicle based on the control-system adjustment value.

What is claimed is:

1. A non-transitory, machine-readable medium storing instructions that, when executed by one or more processors, effectuate operations comprising:
    obtaining a first set of geolocations, a first set of control-system data, and a first set of vehicle proximity data using a first set of sensors, wherein:
        the first set of sensors is attached to a first vehicle,
        the first vehicle includes one or more of a first set of processors executing a first vehicle application operating as a part of a vehicle computing layer, wherein the vehicle computing layer comprises a set of vehicle applications operating on the first set of processors, wherein each of the first set of processors are attached to one or more vehicles,
        the first set of control-system data comprises data indicating a use of a control system of the first vehicle, and
        the first set of vehicle proximity data comprises data corresponding to a distance to an object from the first vehicle;
    inferring, using the one or more processors attached to the first vehicle, a first set of vehicle computing layer results based on the first set of control-system data and the first set of vehicle proximity data using a first neural network executing on the vehicle computing layer;
    sending the first set of vehicle computing layer results and the first set of geolocations to a local application executing on a local computing layer, wherein:
        the local application comprises a second neural network executing on the local computing layer,
        the local application is configured to receive a second set of vehicle computing layer results and second set of geolocations from a second vehicle,
        the local computing layer comprises a set of local applications, and
        each of the set of local applications is executing on one of a set of computing devices;
    training the second neural network executing on the local computing layer to determine a first set of local computing layer results based on the first set of control-system data, the first set of geolocations, and a second set of control-system data from a second vehicle, wherein:
        the first set of local computing layer results comprises a control-system adjustment value, wherein the control-system adjustment value is at least one of a parameter used by the control system to determine a vehicle response of the first vehicle to an operator-effected change on the control system or a change in the parameter, and
    sending the first set of local computing layer results to a top-view application executing on a top-view computing layer, wherein:
        the top-view computing layer is configured to receive local computing layer results from the set of local applications,
        the top-view computing application comprises a third neural network executing on the top-view computing layer, and
        wherein the top-view computing application also receives a second set of local computing layer results and third set of geolocations from a third vehicle;
    training the third neural network based on the first set of local computing layer results to determine a top-view control-system adjustment value based on a region containing the first set of geolocations, the second set of geolocations, and the third set of geolocations, wherein the top-view control-system adjustment value is different from the control-system adjustment value;
    updating the control-system adjustment value based on the top-view control-system adjustment value;
    transmitting the control-system adjustment value to the first vehicle; and
    adjusting a vehicle response to an operator-effected change in the first vehicle based on the control-system adjustment value.

2. The medium of claim 1, wherein:
sending the first set of vehicle computing layer results comprises sending a masked first set of vehicle computing layer results, wherein the masked first set of vehicle computing layer results is determined by injecting a noise into an initial first set of vehicle computing layer results based on a first amount of noise;
the control-system adjustment value comprises an adjustment to the responsiveness of a vehicle braking system or the responsiveness of a vehicle acceleration system; and
the operations further comprise:
    obtaining the second set of geolocations, the second set of control-system data and a second set of vehicle proximity data from the second vehicle; and
    determining, using the one or more processors attached to the second vehicle, the second set of vehicle computing layer results based on the second set of control-system data and the second set of vehicle proximity data using the second neural network executing on the vehicle computing layer, wherein the determination of the second set of vehicle computing layer results comprises changing the second set of vehicle computing layer results from an initial second set of vehicle computing layer results to a masked second set of vehicle computing layer results using a noise injection method based on a second amount of noise.

3. The medium of claim 1, the operations further comprising:
    obtaining, using one or more roadside sensors, a visual recording of a feature;
    detecting and labeling the feature with the local application based on the visual recording of the feature;
    assigning properties to the feature and assigning properties to another object; and determining that the feature and the another object are physically connected based on a geolocation of the first vehicle and a comparison between the properties assigned to the feature and the properties assigned to the another object.

4. The medium of claim 1, the operations further comprising:
obtaining, using the first set of sensors, a first visual record of an additional vehicle;
performing a machine-learning prediction operation to record a first set of features of the additional vehicle based on the first visual record, wherein the first set of features comprises a first instance of an identifier value that is visible in the first visual record;
mapping the first set of features to a first vehicle profile for the additional vehicle;
obtaining a second visual record of the additional vehicle, wherein the second visual record is captured using one or more sensors other than those in the first set of sensors;
performing a machine-learning prediction operation to record a second set of features of based on the second visual record, wherein the second set of features comprises a second instance of the identifier value;
creating a second vehicle profile for the additional vehicle based on the second visual record, wherein the second vehicle profile comprises the second instance of the identifier value;
mapping the second set of features to a second vehicle profile for the additional vehicle; and
based on a comparison between first instance of the identifier value and the second instance of the identifier value stored in the first vehicle profile and the second vehicle profile, respectively, determining that both vehicle profiles correspond to the additional vehicle.

5. The medium of claim 4, the operations further comprising:
determining that at least one of a third vehicle profile or a fourth vehicle profile includes an indicator that the third vehicle satisfies a vehicle risk warning threshold, and
transmitting a message indicating to the first vehicle identifying the third vehicle in response to the determination that the third vehicle satisfies a vehicle risk warning threshold.

6. The medium of claim 1, wherein:
training the neural network or training the third neural network comprises a generating a set of attention weights corresponding to an event log and weighting each event of the event log by their respective attention weight.

7. The medium of claim 1, wherein:
the control system comprises a vehicle braking system;
the control-system data comprises a measure of a force at which a vehicle operator presses on an accelerator pedal;
the vehicle proximity data comprises a number of detected other moving objects around the vehicle;
training the second neural network executing on the local computing layer comprises inferring an accelerator response rate as the control-system adjustment value based on using the measure of the force, the number of detected other moving objects, and a number of recorded accidents near the vehicle's geolocation as inputs; and
adjusting the vehicle response comprises changing the accelerator response rate, wherein an increase in the accelerator response rate increases the vehicle acceleration with respect to a push in the vehicle accelerator pedal.

8. The medium of claim 1, the operation further comprising selecting a road network graph from a road network graph repository based on the first set of geolocations, wherein:
the road network graph comprises a plurality of nodes and links between the plurality of nodes, wherein each of the plurality of nodes correspond with a history of geolocations visited by the first vehicle,
each respective link of the links between the plurality of nodes comprises a road segment, and the respective link is associated with one or more values that are dependent on a time of day, wherein the one or more values are based on a density measurement corresponding with the respective link.

9. The medium of claim 1, wherein:
determining the first set of vehicle computing layer results comprises using the first set of control-system data as an input for an encoder neural network comprising an input layer and an output layer, wherein a total node count of the input layer is equal to a total node count of the output layer; and
the operations further comprise training the encoder neural network, wherein training the encoder neural network comprises reducing a number of features in the first set of vehicle computing layer results, and wherein the first set of vehicle computing layer results comprises fewer features than a sum of the number of features in the first set of control-system data and the number of features in the vehicle proximity data.

10. The medium of claim 1, the operations further comprising:
encrypting the first set of vehicle computing layer results into a first set of cryptographic hash values;
encrypting the second set of vehicle computing layer results into a second set of cryptographic hash values;
wherein the first set of vehicle computing layer results is received by the local computing layer as the first set of cryptographic hash values and the second set of vehicle computing layer results are received by the local computing layer as the second set of cryptographic hash values; and
determining a set of central tendency measurements based on the first encrypted set of values and the second encrypted set of values; and
transmitting the set of central tendency measurements to the first vehicle and the second vehicle.

11. The medium of claim 1, the operations further comprising transmitting a weight of a first vehicle neural network from the first vehicle to the second vehicle, wherein the first vehicle neural network is configured to be executed on the one or more processors attached to the first vehicle.

12. The medium of claim 1, the operations further comprising:
determining a baseline threshold region for the first vehicle based on data from the first set of sensors, where the baseline threshold region comprises at least one range of values, and wherein a determination that a set of data that satisfies the baseline threshold region indicates that a status represented by the set of data is normal;
determining whether the baseline threshold region has been satisfied determining the set of data;
determine a defective sensor in the first set of sensors responsible for an abnormal signal; and displaying a message in the first vehicle indicating the defective sensor.

13. The medium of claim 1, the operations further comprising transmitting one or more application state values from a first data center in the local computing layer to a second data center in the local computing layer, wherein the one or more application state values are usable by a fourth neural network configured to be executable by the second data center.

14. The medium of claim 1, the operations further comprising:
displaying a query in the first vehicle in response to a detected event to confirm that the detected event occurred;
obtaining a response to the query; and
transmitting the response from the first vehicle to the local application.

15. The medium of claim 1, wherein:
training the third neural network comprises training the third neural network to determine the control-system adjustment value based on an operator profile and a vehicle profile as inputs; and
the operations further comprise:
determining the vehicle profile based on sensor data, wherein the vehicle profile comprises a history of events for the first vehicle; and
determining the operator profile corresponding to a vehicle operator of the first vehicle, wherein the operator profile includes a plurality of records corresponding to events during which the vehicle operator of the first vehicle was operating the first vehicle.

16. The medium of claim 1, further comprising:
selecting a road network graph from a road network graph repository based on the first set of geolocations;
training the third neural network or the second neural network to label a region of the road network graph as a high risk region; and
indicate that the high risk region is a possible site for deployment of a roadside device.

17. The medium of claim 1, the operations further comprising:
determining that a first sensor in the first vehicle is defective based on a comparison between an output of the first sensor and a detected event;
wherein training the second neural network comprises training the second neural network without using any feature associated with the first sensor as an input; and
wherein training the third neural network comprises training the third neural network without using any feature associated with the first sensor as an input.

18. The medium of claim 1, wherein the third neural network comprises a first set of perceptrons in a neural network layer, wherein each of the first set of perceptrons are connected with a subset of perceptrons in a second neural network layer.

19. The medium of claim 1, wherein the first neural network comprises a directed cyclic graph of perceptrons, wherein a plurality of the perceptrons comprises a time-varying activation value, and wherein the first set of geolocations, the first set of control-system data, the first set of vehicle proximity data are concurrently obtained.

20. A method comprising:
obtaining a first set of geolocations, a first set of control-system data, and a first set of vehicle proximity data using a first set of sensors, wherein:
the first set of sensors is attached to a first vehicle,
the first vehicle includes one or more of a first set of processors executing a first vehicle application operating as a part of a vehicle computing layer, wherein the vehicle computing layer comprises a set of vehicle applications operating on the first set of processors, wherein each of the first set of processors are attached to one or more vehicles,
the first set of control-system data comprises data indicating a use of a control system of the first vehicle, and
the first set of vehicle proximity data comprises data corresponding to a distance to an object from the first vehicle;
inferring, using the one or more processors attached to the first vehicle, a first set of vehicle computing layer results based on the first set of control-system data and the first set of vehicle proximity data using a first neural network executing on the vehicle computing layer;
sending the first set of vehicle computing layer results and the first set of geolocations to a local application executing on a local computing layer, wherein:
the local application comprises a second neural network executing on the local computing layer,
the local application is configured to receive a second set of vehicle computing layer results and second set of geolocations from a second vehicle,
the local computing layer comprises a set of local applications, and
each of the set of local applications is executing on one of a set of computing devices;
training the second neural network executing on the local computing layer to determine a first set of local computing layer results based on the first set of control-system data, the first set of geolocations, and a second set of control-system data from a second vehicle, wherein:
the first set of local computing layer results comprises a control-system adjustment value, wherein the control-system adjustment value is at least one of a parameter used by the control system to determine a vehicle response of the first vehicle to an operator-effected change on the control system or a change in the parameter, and
sending the first set of local computing layer results to a top-view application executing on a top-view computing layer, wherein:
the top-view computing layer is configured to receive local computing layer results from the set of local applications,
the top-view computing application comprises a third neural network executing on the top-view computing layer, and
wherein the top-view computing application also receives a second set of local computing layer results and third set of geolocations from a third vehicle;
training the third neural network based on the first set of local computing layer results to determine a top-view control-system adjustment value based on a region containing the first set of geolocations, the second set of geolocations, and the third set of geolocations, wherein the top-view control-system adjustment value is different from the control-system adjustment value;
updating the control-system adjustment value based on the top-view control-system adjustment value;
transmitting the control-system adjustment value to the first vehicle; and adjusting a vehicle response to an operator-effected change in the first vehicle based on the control-system adjustment value.

\* \* \* \* \*